(12) United States Patent
Tanaka

(10) Patent No.: US 12,437,490 B2
(45) Date of Patent: Oct. 7, 2025

(54) INFORMATION PROCESSING DEVICE, INFORMATION PROCESSING METHOD, AND PROGRAM

(71) Applicant: Sony Group Corporation, Tokyo (JP)

(72) Inventor: Tomohisa Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 324 days.

(21) Appl. No.: 18/019,975

(22) PCT Filed: Aug. 6, 2021

(86) PCT No.: PCT/JP2021/029392
§ 371 (c)(1),
(2) Date: Feb. 6, 2023

(87) PCT Pub. No.: WO2022/064881
PCT Pub. Date: Mar. 31, 2022

(65) Prior Publication Data
US 2023/0290092 A1    Sep. 14, 2023

(30) Foreign Application Priority Data

Sep. 28, 2020 (JP) ................................ 2020-162211

(51) Int. Cl.
*G06T 19/20* (2011.01)
*G06T 7/70* (2017.01)
(52) U.S. Cl.
CPC ................ *G06T 19/20* (2013.01); *G06T 7/70* (2017.01); *G06T 2219/2016* (2013.01)

(58) Field of Classification Search
CPC ... G06T 19/20; G06T 7/70; G06T 2219/2016; G06F 3/014; G06F 3/017; G06F 3/0304; G06F 3/011; G06V 40/113; G06V 40/28
See application file for complete search history.

(56) References Cited

U.S. PATENT DOCUMENTS 11,501,552 B2 * 11/2022 Mori ....................... G06F 3/017
2017/0235364 A1 * 8/2017 Nakamura .............. G06F 3/016
345/156

FOREIGN PATENT DOCUMENTS

| EP | 3617845 A1 | 3/2020 |
| JP | 2017-059088 A | 3/2017 |
| JP | 2017-084307 A | 5/2017 |
| JP | 2019-046291 A | 3/2019 |
| JP | 2020-091904 A | 6/2020 |

* cited by examiner

*Primary Examiner* — Chong Wu
(74) *Attorney, Agent, or Firm* — Paratus Law Group, PLLC

(57) ABSTRACT

There is provided an information processing device capable of suppressing a decrease in recognition accuracy of a recognition target. The information processing device includes a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

20 Claims, 18 Drawing Sheets

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2021/029392 (filed on Aug. 6, 2021) under 35 U.S.C. § 371, which claims priority to Japanese Patent Application No. 2020-162211 (filed on Sep. 28, 2020), which are all hereby incorporated by reference in their entirety.

TECHNICAL FIELD

The present disclosure relates to an information processing device, an information processing method, and a program.

BACKGROUND ART

In recent years, various techniques for recognizing a predetermined recognition target existing in a real space and executing processing according to a recognition result are known. For example, there is disclosed a technique for controlling a virtual object presented on a display worn on a head of a user on the basis of a recognition result of an input device as an example of the recognition target (see, for example, Patent Document 1).

CITATION LIST

Patent Document

Patent Document 1: Japanese Patent Application Laid-Open No. 2019-46291

SUMMARY OF THE INVENTION

Problems to be Solved by the Invention

However, a situation may occur in which a recognition target is shielded by another target. In such a situation, it can be assumed that recognition accuracy of the recognition target decreases. Therefore, it is desired to provide a technique capable of suppressing a decrease in recognition accuracy of a recognition target.

Solutions to Problems

According to one aspect of the present disclosure, there is provided an information processing device including: a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

Furthermore, according to another aspect of the present disclosure, there is provided an information processing method including, by a processor, controlling a presentation unit to present, to a user, notification information prompting to change an orientation of at least any one of a first part or a second part, on the basis of determination that the first part shields the second part recognized on the basis of a captured image including the first part of a body of the user in an imaging range.

Furthermore, according to another aspect of the present disclosure, there is provided a program for causing a computer to function as an information processing device including: a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

MODE FOR CARRYING OUT THE INVENTION

Figure 1:
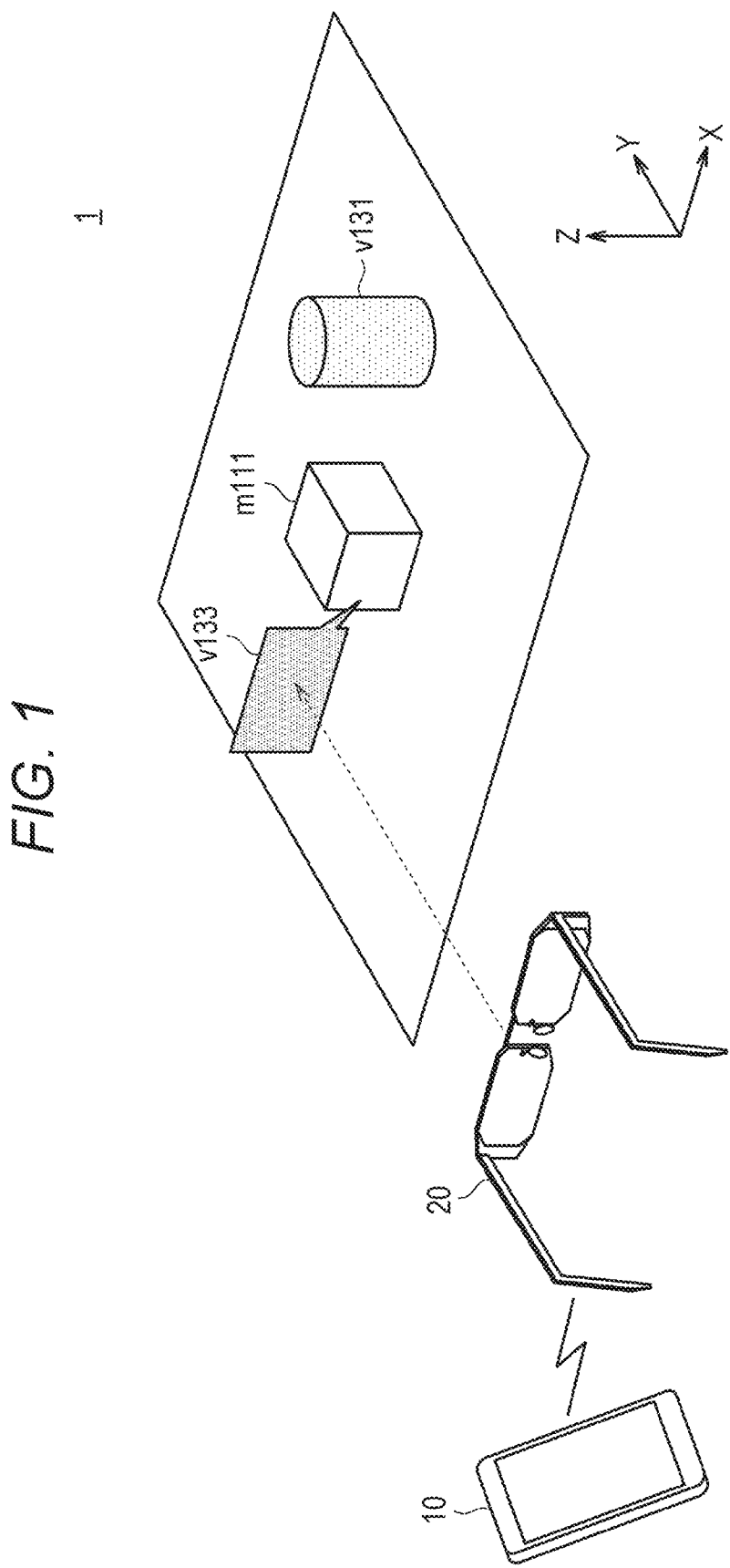
FIG. 1 is an explanatory view for explaining an example of a schematic configuration of an information processing system according to an embodiment of the present disclosure.

Hereinafter, a preferred embodiment of the present disclosure will be described in detail with reference to the accompanying drawings. Note that, in the present specification and the drawings, components having substantially the same functional configuration are denoted by the same reference numerals, and redundant explanations are omitted.

Furthermore, in the present specification and the drawings, a plurality of components having substantially the same or similar functional configurations may be distinguished by attaching different numbers after the same reference numerals. However, in a case where it is not particularly necessary to distinguish each of the plurality of components having substantially the same or similar functional configuration, only the same reference numeral is assigned. Furthermore, similar components of different embodiments may be distinguished by adding different alphabets after the same reference numerals. However, in a case where it is not necessary to particularly distinguish each of the similar components, only the same reference numeral is assigned.

Note that, the description will be made in the following order.

1. System configuration
2. Configuration of input/output device
3. Configuration of wearable device
4. Functional configuration of system
5. Reliability of finger joint recognition
6. Notable features
6.1. Basic control
6.2. Example of integration of finger joint position and occlusion detection
6.3. Specific example of guide UI
6.4. Various modifications
7. Hardware configuration example
8. Conclusion 1. System Configuration First, with reference to FIG. 1, an example of a schematic configuration of an information processing system according to an embodiment of the present disclosure will be described. FIG. 1 is an explanatory view for explaining an example of a schematic configuration of an information processing system according to an embodiment of the present disclosure, and illustrates an example of a case where various contents are presented to a user by applying a so-called augmented reality (AR) technology.

In FIG. 1, a reference numeral m111 schematically indicates an object (for example, a real object) located in a real space. Furthermore, reference numerals v131 and v133 schematically indicate a virtual content (for example, a virtual object) presented so as to be superimposed on the real space. That is, on the basis of the AR technology, for example, an information processing system 1 according to the present embodiment superimposes the virtual object on an object such as the real object m111 in the real space and presents to the user. Note that, in FIG. 1, for easier understanding of features of the information processing system according to the present embodiment, both the real object and the virtual object are presented together.

As illustrated in FIG. 1, the information processing system 1 according to the present embodiment includes an information processing device 10 and an input/output device 20. The information processing device 10 and the input/output device 20 are configured to be able to transmit and receive information to and from each other via a predetermined network. Note that a type of the network connecting the information processing device 10 and the input/output device 20 is not particularly limited. As a specific example, the network may be configured with a so-called wireless network such as a network based on the Wi-Fi (registered trademark) standard. Furthermore, as another example, the network may be configured with the Internet, a dedicated line, a local area network (LAN), a wide area network (WAN), or the like. Furthermore, the network may include a plurality of networks, and at least a part thereof may be configured as a wired network.

The input/output device 20 is a configuration to acquire various types of input information and present various types of output information to a user who holds the input/output device 20. Furthermore, the presentation of the output information by the input/output device 20 is controlled by the information processing device 10 on the basis of the input information acquired by the input/output device 20. For example, the input/output device 20 acquires information (for example, a captured image of the real space) for recognizing the real object m111 as the input information, and outputs the acquired information to the information processing device 10. The information processing device 10 recognizes a position of the real object m111 in the real space on the basis of the information acquired from the input/output device 20, and controls the input/output device 20 to present the virtual objects v131 and v133 on the basis of a recognition result. Such control allows the input/output device 20 to present the virtual objects v131 and v133 to the user such that the virtual objects v131 and v133 are superimposed on the real object m111, on the basis of a so-called AR technology.

Furthermore, the input/output device 20 is configured as, for example, a so-called head-mounted device that is used by being worn on at least a part of the head by the user, and may be configured to be able to detect a user's line-of-sight. On the basis of such a configuration, in a case where the information processing device 10 recognizes that the user is gazing at a desired target (for example, the real object m111, the virtual objects v131 and v133, and the like), for example, on the basis of a detection result of the user's line-of-sight obtained by the input/output device 20, the information processing device 10 may specify the target as an operation target. Furthermore, the information processing device 10 may specify the target to which the user's line-of-sight is directed as the operation target, by using a predetermined operation on the input/output device 20 as a trigger. As described above, the information processing device 10 may provide various services to the user via the input/output device 20 by specifying the operation target and executing processing associated with the operation target.

The information processing device 10 recognizes a motion (for example, a change in position and direction, a gesture, or the like) of a position/orientation of an arm, a palm, and a finger joint of the user as a user's operation input on the basis of input information acquired by the input/output device 20, and executes various processes according to a recognition result of the operation input. As a specific example, the input/output device 20 acquires information (for example, a captured image of a hand) for recognizing an arm, a palm, and a finger joint of the user as the input information, and outputs the acquired information to the information processing device 10. The information processing device 10 estimates a position/orientation of the arm, the palm, and the finger joint on the basis of the information acquired from the input/output device 20 to recognize a motion thereof (for example, a gesture), and recognizes an instruction (that is, a user's operation input) from the user in accordance with a recognition result of the motion. Then, the information processing device 10 may control, for example, display of a virtual object (for example, a display position and orientation of the virtual object) to be presented to the user in accordance with a recognition result of the user's operation input. Note that, in the present disclosure, the "user's operation input" may be regarded as an input corresponding to an instruction from the user as described above, in other words, an input reflecting an intention of the user. Hereinafter, the "user's operation input" may be simply referred to as a "user input".

Furthermore, the information processing device 10 may recognize a motion (for example, a change in position and orientation, a gesture, or the like) of at least a part of the body of the user other than the hand as the user's operation input on the basis of the input information acquired by the input/output device 20, and execute various processes according to a recognition result of the operation input.

Figure 2:
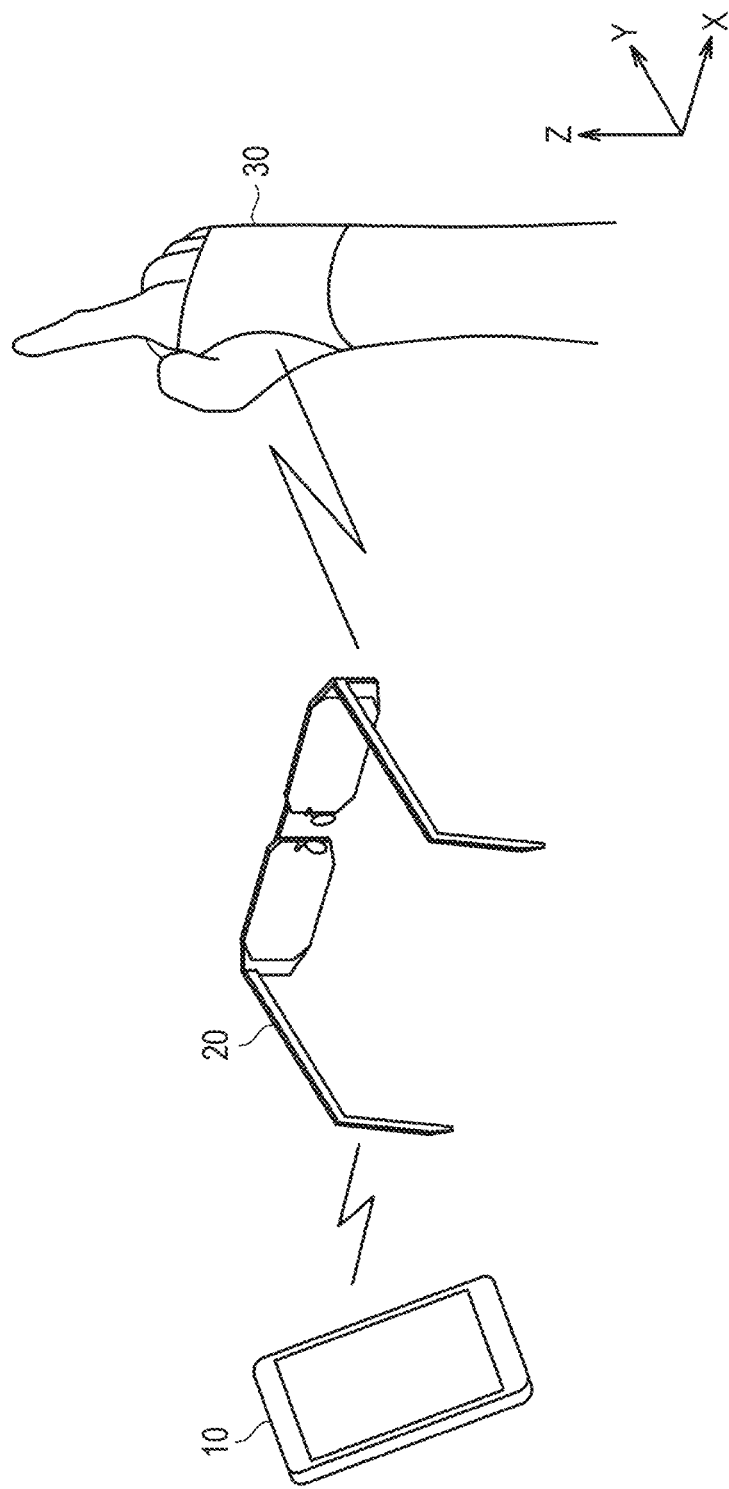
FIG. 2 is a view illustrating an example of a case where various contents are presented in response to a user's operation input by applying an AR technology.

Next, with reference to FIG. 2, an example of a schematic configuration will be described in which a position and an orientation of a palm of the user are acquired by a wearable device 30 worn on the palm (or the back of the hand) by the user, the information processing device 10, and the input/output device 20. FIG. 2 illustrates an example of a case where various contents are presented in response to a motion of a hand of the user, that is, a user's operation input, by applying a so-called augmented reality (AR) technology.

As illustrated in FIG. 2, the information processing system 1 according to the present embodiment includes the information processing device 10, the input/output device 20, and the wearable device 30. The information processing device 10, the input/output device 20, and the wearable device 30 are configured to be able to transmit and receive information to and from each other via a predetermined network. Note that a type of the network connecting the information processing device 10, the input/output device 20, and the wearable device 30 is not particularly limited.

The input/output device 20 acquires information for detecting a position and an orientation of the palm-mounted wearable device 30 (as an example, with relatively low accuracy) as input information, and outputs the acquired input information to the information processing device 10. Hereinafter, a case will be mainly assumed in which acceleration information and angular velocity information outputted from an inertial measurement unit (IMU) of the wearable device 30 are used as such input information. However, such input information is not limited to the information outputted from the IMU. For example, such input information may be information outputted from a magnetic sensor as described later.

Moreover, the wearable device 30 includes optical markers (for example, active markers of light emitting diode (LED) emission, passive markers of a retroreflective material, or the like) arranged in a prescribed pattern. Note that, since the wearable device 30 illustrated in FIG. 2 is simply illustrated, the optical markers are not illustrated, but the optical markers will be described in detail later with reference to FIG. 4. The input/output device 20 acquires an image obtained by imaging the optical marker. The information processing device 10 acquires a position and an orientation of the wearable device 30 (for example, with relatively high accuracy) on the basis of input information of the captured image of the optical marker acquired by the input/output device 20.

According to these configurations, the position and the orientation of the wearable device 30 can be obtained (for example, with relatively low accuracy) when a distance between the input/output device 20 and the wearable device 30 is within a certain range (for example, 1 m), and the position and the orientation of the wearable device 30 can be obtained (for example, with relatively high accuracy) only in a case where at least a certain number or more of the optical markers of the wearable device 30 are shown in a field of view (FoV) of a recognition camera provided in the input/output device 20.

Note that, in FIGS. 1 and 2, the input/output device 20 and the information processing device 10 are illustrated as different devices, but the input/output device 20 and the information processing device 10 may be integrally configured. Furthermore, details of configurations and processing of the input/output device 20 and the information processing device 10 will be separately described later.

An example of a schematic configuration of the information processing system 1 according to an embodiment of the present disclosure has been described above with reference to FIGS. 1 and 2.

2. Configuration of Input/Output Device

Figure 3:
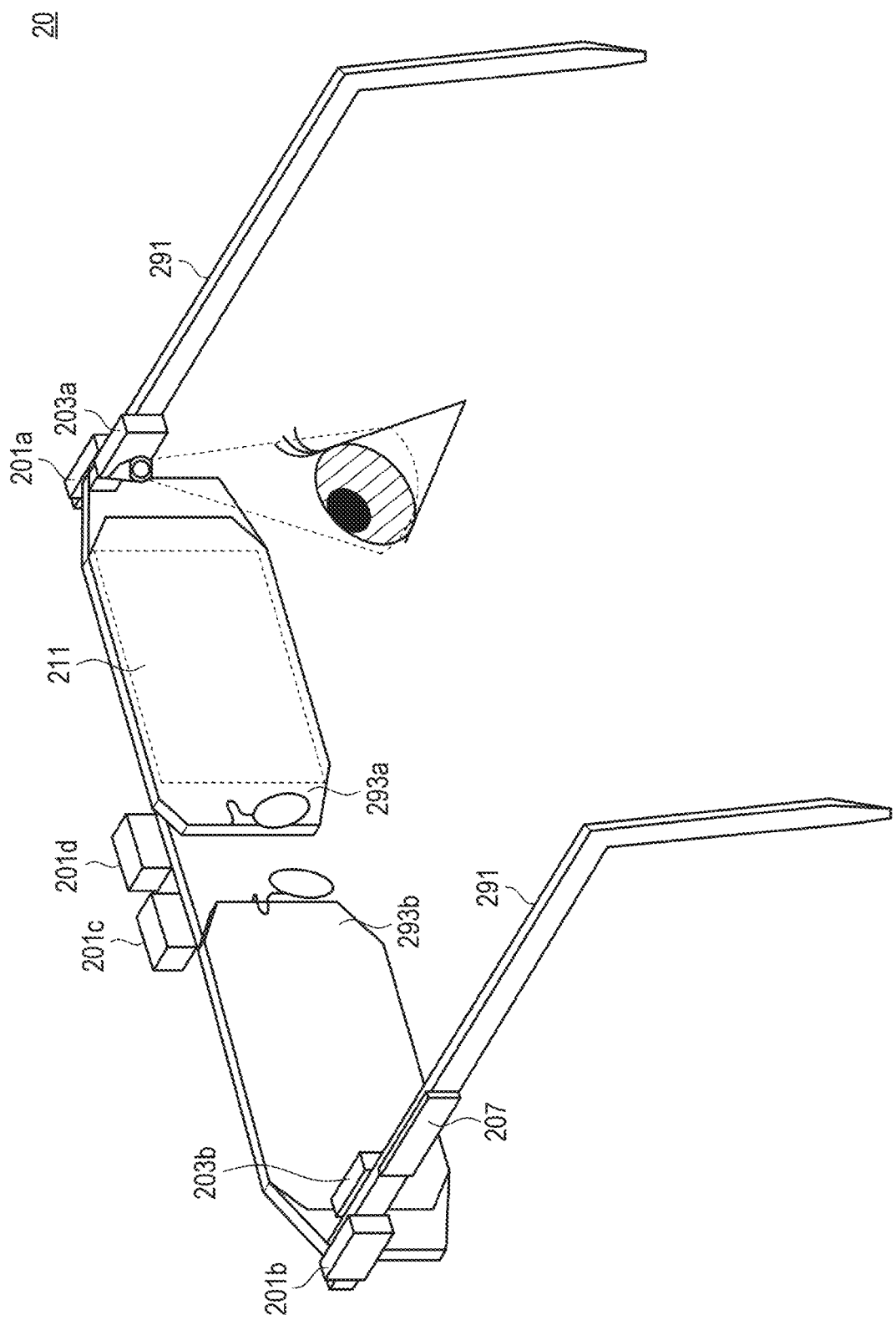
FIG. 3 is an explanatory view for explaining an example of a schematic configuration of an input/output device.

Next, with reference to FIG. 3, an example of a schematic configuration of the input/output device 20 according to the present embodiment illustrated in FIGS. 1 and 2 will be described. FIG. 3 is an explanatory view for explaining an example of a schematic configuration of the input/output device 20 according to the present embodiment.

As described above, the input/output device 20 according to the present embodiment is configured as a so-called head-mounted device that is used by being worn on at least a part of the head by the user, and at least any one of lenses 293a and 293b is configured as a transmissive display (a display unit 211). Furthermore, the input/output device 20 includes imaging units 201a and 201b, an operation unit 207, and a holding unit 291 corresponding to a frame of glasses. Furthermore, the input/output device 20 may include imaging units 203a and 203b. Note that, hereinafter, various descriptions will be given on the assumption that the input/output device 20 includes the imaging units 203a and 203b. When the input/output device 20 is worn on the head of the user, the holding unit 291 holds the display unit 211, the imaging units 201a and 201b, the imaging units 203a and 203b, and the operation unit 207 so as to have a predetermined positional relationship with respect to the head of the user. Furthermore, although not illustrated in FIG. 3, the input/output device 20 may include a sound collection unit for collection of user's voice.

Here, a more specific configuration of the input/output device 20 will be described. For example, in the example illustrated in FIG. 3, the lens 293a corresponds to a lens on the right eye side, and the lens 293b corresponds to a lens on the left eye side. That is, in a case where the input/output device 20 is worn, the holding unit 291 holds the display unit 211 such that the display unit 211 (in other words, the lenses 293a and 293b) is positioned in front of the eyes of the user.

The imaging units 201a and 201b are configured as so-called stereo cameras, and are individually held by the holding unit 291 so as to face a direction in which the head of the user faces (that is, in front of the user) when the input/output device 20 is worn on the head of the user. At this time, the imaging unit 201a is held in the vicinity of the right eye of the user, and the imaging unit 201b is held in the vicinity of the left eye of the user. On the basis of such a configuration, the imaging units 201a and 201b image a subject (in other words, a real object located in the real space) located in front of the input/output device 20 from mutually different positions. As a result, the input/output device 20 can acquire an image of the subject located in front of the user, and calculate a distance to the subject from the input/output device 20 (accordingly, a position of a viewpoint of the user) on the basis of parallax between images captured by the imaging units 201*a* and 201*b*.

Note that the configuration and method are not particularly limited as long as the distance between the input/output device 20 and the subject can be measured. As a specific example, the distance between the input/output device 20 and the subject may be measured on the basis of a method such as multi-camera stereo, moving parallax, time of flight (TOF), or Structured Light.

Here, the TOF is a method of obtaining an image (a so-called distance image) including a distance (a depth) to a subject on the basis of a measurement result, by projecting light such as infrared rays to the subject and measuring a time until the projected light is reflected by the subject and returned for every pixel.

Furthermore, the Structured Light is a method of obtaining a distance image including a distance (a depth) to a subject on the basis of a change in pattern obtained from an imaging result by irradiating the subject with the pattern with light such as infrared rays and imaging the pattern.

Furthermore, the moving parallax is a method of measuring a distance to a subject on the basis of parallax even in a so-called monocular camera. Specifically, by moving the camera, the subject is imaged from different viewpoints, and a distance to the subject is measured on the basis of parallax between the captured images.

Note that, at this time, by recognizing a moving distance and a moving direction of the camera by various sensors, the distance to the subject can be measured more accurately. Note that a configuration of the imaging unit (for example, a monocular camera, a stereo camera, or the like) may be changed according to the distance measurement method.

Furthermore, the imaging units 203*a* and 203*b* are individually held by the holding unit 291 such that eyeballs of the user are positioned within individual imaging ranges when the input/output device 20 is worn on the head of the user. As a specific example, the imaging unit 203*a* is held such that the right eye of the user is positioned within the imaging range. On the basis of such a configuration, it is possible to recognize a direction in which a line-of-sight of the right eye is directed on the basis of an image of the eyeball of the right eye captured by the imaging unit 203*a* and a positional relationship between the imaging unit 203*a* and the right eye. Similarly, the imaging unit 203*b* is held such that the left eye of the user is positioned within the imaging range. That is, a direction in which a line-of-sight of the left eye is directed can be recognized on the basis of an image of the eyeball of the left eye captured by the imaging unit 203*b* and a positional relationship between the imaging unit 203*b* and the left eye. Note that the example illustrated in FIG. 3 illustrates a configuration in which the input/output device 20 includes both the imaging units 203*a* and 203*b*, but only any of the imaging units 203*a* and 203*b* may be provided.

Furthermore, an infrared (IR) light source 201*c* and an IR imaging unit 201*d* for hand position detection are for obtaining a position and an orientation of the wearable device 30 (as viewed from the input/output device 20). Infrared light (for example, 940 nm) emitted from the IR light source 201*c* is reflected by an optical marker (FIG. 4) of the retroreflective material of the wearable device 30, and is imaged by the IR imaging unit 201*d* (alternatively, a configuration may be adopted in which the IR light source 201*c* is not provided, and an optical marker 320 (FIG. 4) is an IR LED (for example, having a wavelength of 940 nm) and emits light by itself). The IR imaging unit 201*d* includes a bandpass filter through which only infrared light (centered on a 940 nm band as an example) passes, and only a bright spot of the optical marker 320 (FIG. 4) is imaged. A relative position and orientation of the wearable device 30 from the input/output device 20 can be obtained (for example, with relatively high accuracy) from the image of the bright spot.

The operation unit 207 is a configuration to receive an operation on the input/output device 20 from the user. The operation unit 207 may include, for example, an input device such as a touch panel or a button. The operation unit 207 is held at a predetermined position of the input/output device 20 by the holding unit 291. For example, in the example illustrated in FIG. 3, the operation unit 207 is held at a position corresponding to a temple of glasses.

Furthermore, the input/output device 20 according to the present embodiment is provided with, for example, an inertial measurement unit 220 (FIG. 5) (IMU) including an acceleration sensor, a gyro sensor (an angular velocity sensor), and the like (not illustrated). The input/output device 20 can acquire acceleration information and angular velocity information outputted from the IMU. Then, a motion of the head of the user wearing the input/output device 20 (in other words, a motion of the input/output device 20 itself) can be detected on the basis of such acceleration information and angular velocity information. As a specific example, by acquiring the acceleration information and the angular velocity information outputted by the IMU of the input/output device 20, calculating a position and an orientation of the input/output device 20 by inertial navigation, and correcting a drift error generated at that time by a regression model, the information processing device 10 can estimate position information and orientation information of the input/output device 20 and acquire the position and the orientation of the head of the user.

On the basis of the configuration described above, the input/output device 20 according to the present embodiment can recognize a change in position and orientation of the self in the real space according to a motion of the head of the user. Furthermore, at this time, the input/output device 20 can also present a virtual content (that is, a virtual object) on the display unit 211 such that the virtual content is superimposed on a real object located in the real space, on the basis of a so-called AR technology. Furthermore, at this time, on the basis of a technology called simultaneous localization and mapping (SLAM) or the like, for example, the input/output device 20 may estimate the position and the orientation of the self (that is, an own position) in the real space, and use an estimation result for presentation of the virtual object.

Here, an overview of the SLAM will be described as a reference. The SLAM is a technique of performing own position estimation and creation of an environmental map in parallel by using an imaging unit such as a camera, various sensors, an encoder, and the like. As a more specific example, in the SLAM (in particular, Visual SLAM), a three-dimensional shape of a captured scene (or subject) is sequentially restored on the basis of a moving image captured by the imaging unit. Then, by associating a restoration result of the captured scene with a detection result of a position and an orientation of the imaging unit, a map of a surrounding environment is created, and the position and the orientation of the imaging unit (accordingly, the input/output device 20) in the environment are estimated. Note that, for example, by providing various sensors such as an acceleration sensor and an angular velocity sensor in the input/output device 20, the position and the orientation of the imaging unit can be estimated as information indicating a relative change on the basis of a detection result of the sensor. Of course, as long as the position and the orientation of the imaging unit can be estimated, the method is not necessarily limited only to the method based on detection results of various sensors such as the acceleration sensor and the angular velocity sensor.

Furthermore, examples of a head-mounted display device (a head mounted display: HMD) applicable as the input/output device 20 include a see-through HMD, a video see-through HMD, and a retinal projection HMD, for example.

The see-through HMD uses, for example, a half mirror or a transparent light guide plate to hold a virtual image optical system including a transparent light guide unit or the like in front of the user's eyes, and controls to display an image inside the virtual image optical system. Therefore, the user wearing the see-through HMD can view external scenery while viewing the image displayed inside the virtual image optical system. With such a configuration, the see-through HMD can also superimpose an image of the virtual object on an optical image of a real object located in a real space in accordance with a recognition result of at least any of a position or an orientation of the see-through HMD, for example, on the basis of the AR technology. Note that, as a specific example of the see-through HMD, there is a so-called glasses-type wearable device in which a portion corresponding to a lens of glasses is configured as a virtual image optical system. For example, the input/output device 20 illustrated in FIG. 3 corresponds to an example of the see-through HMD.

In a case where the video see-through HMD is worn on the head or the face of the user, the video see-through HMD is worn so as to cover the eyes of the user, and a display unit such as a display is held in front of the eyes of the user. Furthermore, the video see-through HMD includes an imaging unit for capturing an image of surrounding scenery, and causes the display unit to display the image of the scenery captured by the imaging unit in front of the user. With such a configuration, although it is difficult for the user wearing the video see-through HMD to directly view the external scenery, the user can recognize the external scenery with the image displayed on the display unit. Furthermore, at this time, the video see-through HMD may superimpose a virtual object on an image of the external scenery in accordance with a recognition result of at least any of a position or an orientation of the video see-through HMD, for example, on the basis of the AR technology.

In the retinal projection HMD, a projection unit is held in front of the eyes of the user, and an image is projected from the projection unit toward the eyes of the user such that the image is superimposed on external scenery. More specifically, in the retinal projection HMD, an image is directly projected from the projection unit onto the retina of the user's eye, and the image is formed on the retina. With such a configuration, even in a case of a near-sighted or far-sighted user, a clearer video image can be visually recognized. Furthermore, the user wearing the retinal projection HMD can view the external scenery even while viewing the image projected from the projection unit. According to such a configuration, the retinal projection HMD can also superimpose an image of a virtual object on an optical image of a real object located in a real space in accordance with a recognition result of at least any of a position or an orientation of the retinal projection HMD, for example, on the basis of the AR technology.

Furthermore, in the description described above, an example of the configuration of the input/output device 20 according to the present embodiment has been described on the assumption that the AR technology is applied, but the configuration of the input/output device 20 is not necessarily limited. For example, in a case where it is assumed that a VR technology is applied, the input/output device 20 according to the present embodiment may be configured as an HMD called an immersive HMD. Similarly to the video see-through HMD, the immersive HMD is worn so as to cover the eyes of the user, and a display unit such as a display is held in front of the eyes of the user. Therefore, it is difficult for the user wearing the immersive HMD to directly view external scenery (that is, scenery in the real world), and only a video image displayed on the display unit comes into the sight. With such a configuration, the immersive HMD can give a sense of immersion to the user viewing the image.

An example of the schematic configuration of the input/output device 20 according to an embodiment of the present disclosure has been described above with reference to FIG. 3.

3. Configuration of Wearable Device

Figure 4:
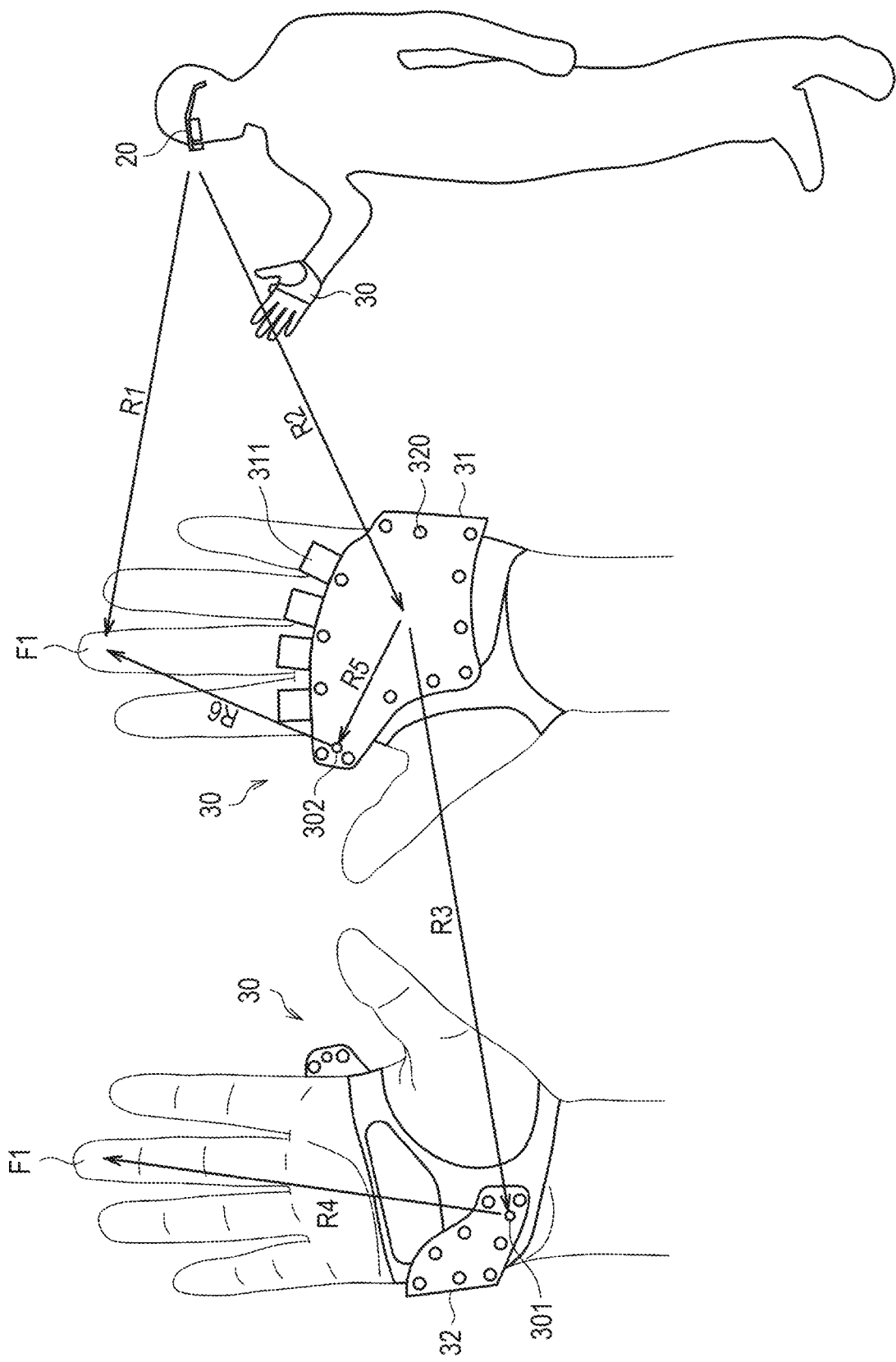
FIG. 4 is an explanatory view for explaining an example of a schematic configuration of a wearable device.

Next, with reference to FIG. 4, an example of a schematic configuration of the wearable device 30 according to the present embodiment illustrated in FIGS. 1 and 2 will be described. FIG. 4 is an explanatory view for explaining an example of a schematic configuration of the wearable device 30 according to the present embodiment.

As described above, the wearable device 30 according to the present embodiment is configured as a so-called mounted device that is used by being worn on a palm of a user. For example, in the example illustrated in FIG. 4, the wearable device 30 is configured as a so-called palm vest device. Furthermore, the wearable device 30 includes an imaging unit (palm side) 301 and an imaging unit (hand back side) 302, the imaging unit (palm side) 301 is arranged on the palm side so that a finger of the hand on which the wearable device 30 is worn can be imaged from the palm side, and the imaging unit (hand back side) 302 is arranged on the hand back side so that a finger of the hand on which the wearable device 30 is worn can be imaged from the hand back side.

Note that each of the imaging unit (palm side) 301 and the imaging unit (hand back side) 302 is configured as a TOF sensor, and can obtain a depth (a distance to a finger) on the basis of a depth image obtained by the TOF sensor. However, a type of the sensor of each of the imaging unit (palm side) 301 and the imaging unit (hand back side) 302 is not limited to the TOF sensor, and may be another sensor capable of obtaining the depth. Alternatively, one or both of the imaging unit (palm side) 301 and the imaging unit (hand back side) 302 may be a 2D sensor such as an IR sensor.

Furthermore, the wearable device 30 includes a plurality of optical markers 320 whose surfaces are retroreflective materials, an inertial measurement unit 303 (FIG. 5), and a vibration presentation unit 311. Referring to FIG. 4, a finger F1 is illustrated. Furthermore, a relative position and orientation of the finger F1 (as viewed from the imaging unit 201) are illustrated as a position/orientation R1. Here, the relative position (as viewed from the imaging unit 201) can be represented by coordinates in a camera coordinate system with respect to the imaging unit 201. Note that the imaging unit 201 as a reference is not particularly limited (for example, the imaging unit 201a may be the reference).

Furthermore, a relative position and orientation of the wearable device 30 (as viewed from the imaging unit 201) are illustrated as a position/orientation R2. Moreover, a relative position and orientation (as viewed from the wearable device 30) of the imaging unit (palm side) 301 are illustrated as a position/orientation R3. Furthermore, a relative position and orientation of the finger F1 (as viewed from the imaging unit (palm side) 301) are illustrated as a position/orientation R4. Moreover, a relative position and orientation (as viewed from the wearable device 30) of the imaging unit (hand back side) 302 are illustrated as a position/orientation R5. Furthermore, a relative position and orientation of the finger F1 (as viewed from the imaging unit (hand back side) 302) are illustrated as a position/orientation R6.

Note that, in FIG. 4, the finger F1 corresponding to the middle finger is illustrated as an example of the finger. However, as will be described later, in the present embodiment, a finger (that is, the thumb, the index finger, the ring finger, and the little finger) other than the middle finger can also be treated as a finger similarly to the finger F1 corresponding to the middle finger.

The optical marker 320 reflects irradiation light of the IR light source 201c of the input/output device 20. The reflected light is imaged by the IR imaging unit 201d, and a relative position and orientation (as viewed from the imaging unit 201) of the wearable device 30 are obtained (as an example, with relatively high accuracy) from a bright spot of the obtained video image. Note that the optical marker 320 is not limited to a passive marker using a retroreflective material, and may be an active marker using an IR LED. In a case where the optical marker 320 is an active marker, the IR light source 201c of the input/output device 20 is unnecessary.

The inertial measurement unit 303 (FIG. 5) includes, for example, an IMU, and can acquire acceleration information and angular velocity information outputted from the IMU, similarly to the IMU included in the input/output device 20. On the basis of such acceleration information and angular velocity information, a motion of the hand of the user wearing the wearable device 30 (in other words, a motion of the wearable device 30 itself) can be detected. As a specific example, by acquiring the acceleration information and the angular velocity information outputted by the IMU sensor of the wearable device 30, calculating a position and an orientation of the wearable device 30 by inertial navigation, and correcting a drift error generated at that time by a regression model, the information processing device 10 can estimate position information and orientation information of the wearable device 30 and acquire the position and the orientation of the hand of the user.

The vibration presentation unit 311 presents tactile sensation to the user's hand by driving a vibration actuator that generates vibration. Specifically, while a translation actuator such as a voice coil motor or a linear resonant actuator (LRA), or a rotation actuator such as an eccentric motor is used as the vibration actuator, using the translation actuator makes it possible to drive in a wide frequency range, and high expressiveness of vibration can be obtained. In a case of using the translation actuator, the vibration actuator is driven by applying a voltage of a time-varying analog waveform close to an audio signal. It is conceivable that the vibration actuators are installed at a plurality of places according to a vibration intensity desired to be presented and a part to be presented. Furthermore, apart from a method of directly arranging the vibration actuator on a part (such as a palm) to which vibration is to be presented, for example, a method is also conceivable in which the vibration actuator is arranged on a palm and tactile sensation is presented in a palm shape, in consideration of vibration propagation characteristics for every frequency and a difference in sensitivity of the tactile sensation of the hand.

4. Functional Configuration of System

Figure 5:
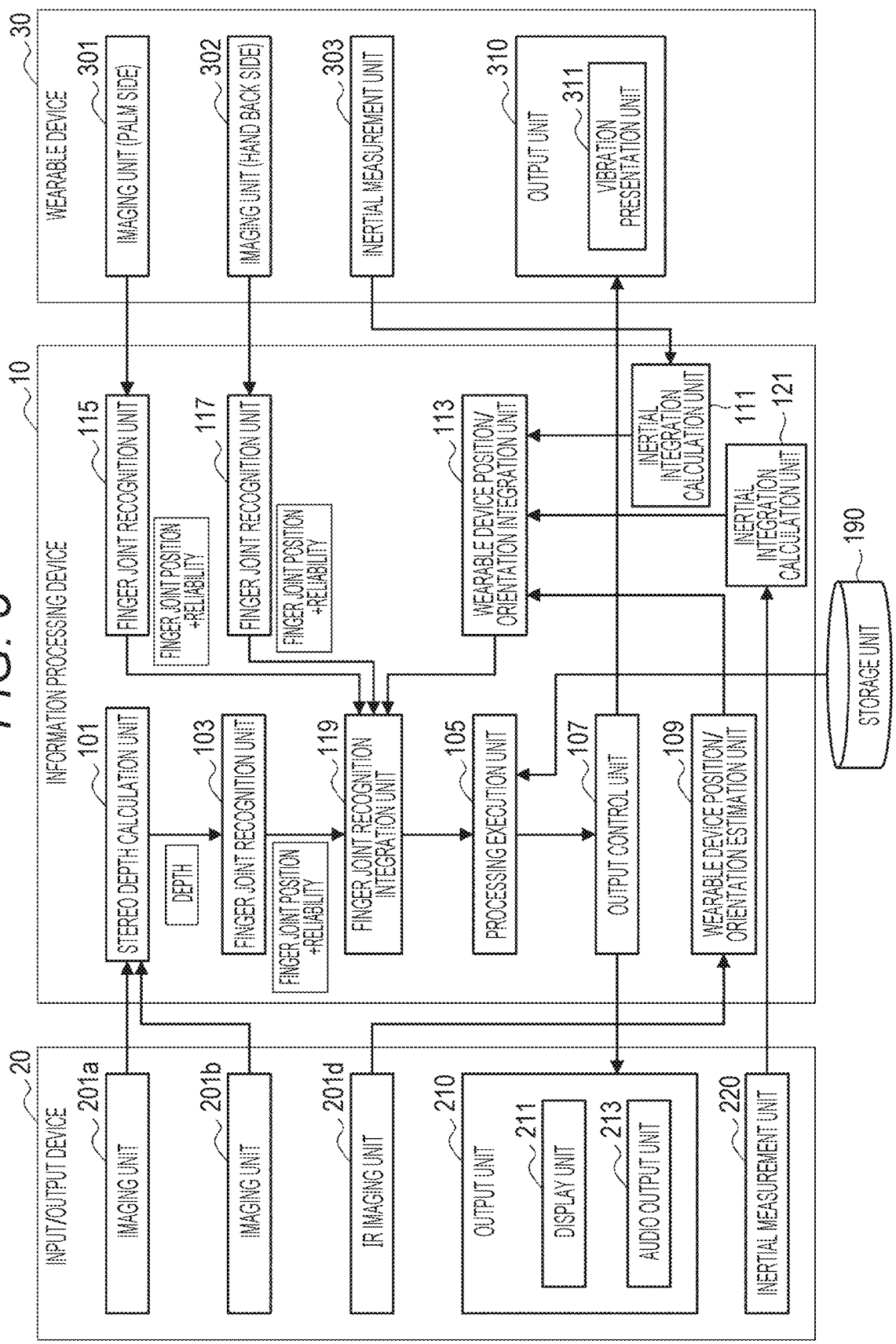
FIG. 5 is a block diagram illustrating an example of a functional configuration of the information processing system.

Next, with reference to FIG. 5, an example of a functional configuration of the information processing system 1 according to the present embodiment will be described. FIG. 5 is a block diagram illustrating an example of a functional configuration of the information processing system 1 according to the present embodiment. Hereinafter, as described with reference to FIG. 1, each configuration of the information processing device 10, the input/output device 20, and the wearable device 30 will be described in more detail on the assumption that the information processing system 1 includes the information processing device 10, the input/output device 20, and the wearable device 30. Note that, as illustrated in FIG. 5, the information processing system 1 may include a storage unit 190.

First, a configuration of the input/output device 20 will be described. As illustrated in FIG. 5, the input/output device 20 includes the imaging units 201a, 201b, and 201d, an output unit 210 (a presentation unit), and the inertial measurement unit 220 (IMU). The output unit 210 includes the display unit 211. Furthermore, the output unit 210 may include an audio output unit 213. The imaging units 201a, 201b, and 201d correspond to the imaging units 201a, 201b, and 201d described with reference to FIG. 2. Note that, in a case where it is not necessary to particularly distinguish from each other, the imaging units 201a, 201b, and 201d may be simply referred to as an "imaging unit 201". Furthermore, the display unit 211 corresponds to the display unit 211 described with reference to FIG. 2. Furthermore, the audio output unit 213 includes an audio device such as a speaker, and outputs voice or audio according to information to be an output target. Furthermore, although not illustrated in FIG. 5, as described above, the input/output device 20 also includes the operation unit 207, the imaging units 203a and 203b, the holding unit 291, and the like.

Next, a configuration of the wearable device 30 will be described. As illustrated in FIG. 5, the wearable device 30 includes the imaging unit (palm side) 301, the imaging unit (hand back side) 302, the inertial measurement unit 303 (IMU), and an output unit 310. The output unit 310 includes the vibration presentation unit 311. The vibration presentation unit 311 includes the vibration actuator, and presents vibration according to information to be an output target. Furthermore, although not illustrated in FIG. 5, as described above, the wearable device 30 also includes the optical marker 320 and the like.

Next, a configuration of the information processing device 10 will be described. As illustrated in FIG. 5, the information processing device 10 includes a stereo depth calculation unit 101, a finger joint recognition unit 103, a finger joint recognition unit 115, a finger joint recognition unit 117, and a finger joint recognition integration unit 119. Furthermore, the information processing device 10 includes a wearable device position/orientation estimation unit 109, an inertial integration calculation unit 111, an inertial integration calculation unit 121, and a wearable device position/orientation integration unit 113. Furthermore, the information processing device 10 includes a processing execution unit 105 and an output control unit 107 (a presentation control unit).

The stereo depth calculation unit 101 acquires images (imaging results) individually outputted from the imaging units 201a and 201b, and generates depth images of a field of view of the imaging units 201a and 201b on the basis of the acquired images. Then, the stereo depth calculation unit 101 outputs the depth images of the field of view of the imaging units 201a and 201b to the finger joint recognition unit 103.

The finger joint recognition unit 103 acquires the depth image generated by the stereo depth calculation unit 101 from the stereo depth calculation unit 101, and recognizes a position of each of the plurality of finger joints on the basis of the acquired depth image. Details of the recognition of each of the finger joint positions will be described later. Then, the finger joint recognition unit 103 outputs a relative position (as viewed from the imaging unit 201) of each recognized finger joint position to the finger joint recognition integration unit 119 as a position/orientation, and outputs reliability (described later) of a recognition result of each finger joint position to the finger joint recognition integration unit 119. Furthermore, in a case where there is a finger joint whose recognition (or estimation) of the position has failed from the depth image, the finger joint recognition unit 103 outputs a result indicating impossibility of estimation as a finger joint (a recognition result) whose recognition has failed.

The finger joint recognition unit 115 acquires an image (an imaging result) outputted from the imaging unit (palm side) 301, and recognizes each finger joint position on the basis of the acquired image. Then, the finger joint recognition unit 115 outputs the recognized relative position of each finger joint (as viewed from the imaging unit (palm side) 301) to the finger joint recognition integration unit 119 as the position/orientation R4 (FIG. 4), and outputs reliability (described later) of a recognition result of each finger joint position to the finger joint recognition integration unit 119.

Similarly, the finger joint recognition unit 117 acquires an image (an imaging result) outputted from the imaging unit (hand back side) 302, and recognizes each finger joint position on the basis of the acquired image. Then, the finger joint recognition unit 117 outputs the recognized relative position of each finger joint (as viewed from the imaging unit (hand back side) 302) to the finger joint recognition integration unit 119 as the position/orientation R6 (FIG. 4), and outputs reliability (described later) of a recognition result of each finger joint position to the finger joint recognition integration unit 119.

Here, the relative position of each finger joint (as viewed from the wearable device 30) is represented by coordinates in a coordinate system with respect to the wearable device 30. Note that the coordinate system with respect to the wearable device 30 is not particularly limited (for example, the coordinate system with respect to the wearable device 30 may be a camera coordinate system of the imaging unit 301). Furthermore, in a case where there is a finger joint whose recognition (or estimation) of the position has failed from the image, each of the finger joint recognition unit 115 and the finger joint recognition unit 117 outputs a result indicating impossibility of estimation as a finger joint (a recognition result) whose recognition has failed.

The wearable device position/orientation estimation unit 109 acquires an image (an imaging result) outputted from the IR imaging unit 201d. In such an image, a plurality of bright spots, which is reflected light of the optical marker 320 included in the wearable device 30, is shown. Therefore, the wearable device position/orientation estimation unit 109 can estimate the relative position and orientation (as viewed from the imaging unit 201) of the wearable device 30 as a position/orientation, on the basis of a positional relationship among the plurality of bright spots. The wearable device position/orientation estimation unit 109 outputs the recognized relative position/orientation (hereinafter, also referred to as a "position/orientation P1") of the wearable device 30 (as viewed from the imaging unit 201), to the wearable device position/orientation integration unit 113.

Here, the relative position/orientation P1 (as viewed from the imaging unit 201) of the wearable device 30 recognized by the wearable device position/orientation estimation unit 109 is expressed by the camera coordinate system with respect to the imaging unit 201. As described above, the reference imaging unit 201 is not particularly limited.

Note that a field of view of the IR imaging unit 201d does not necessarily include all the optical markers 320 of the wearable device 30 (that is, the field of view of the IR imaging unit 201d may not include the optical marker 320 at all or may include only some of the optical markers 320). Alternatively, even when all the optical markers 320 of the wearable device 30 are included in the field of view of the IR imaging unit 201d, the entire reflected light of the optical marker 320 is not always captured by the IR imaging unit 201d due to occlusion or the like (that is, the IR imaging unit 201d may not capture reflected light of the optical marker 320 at all or may capture only some of the optical markers 320). In a case where only less than a certain number of (for example, five) markers among all the optical markers 320 are imaged, the wearable device position/orientation estimation unit 109 outputs a result indicating impossibility of estimation.

The inertial integration calculation unit 111 acquires acceleration information and angular velocity information from the inertial measurement unit 303 (IMU) of the wearable device 30, and estimates a position and an orientation (hereinafter, also referred to as a "position/orientation P2") of the wearable device 30 (for example, with relatively low accuracy) on the basis of the acquired acceleration information and angular velocity information. Such a position/orientation P2 is expressed by a global coordinate system. For example, by calculating a position and an orientation of the wearable device 30 by inertial navigation, and correcting a drift error generated at that time by using a regression model, the inertial integration calculation unit 111 can estimate position information and orientation information of the wearable device 30. The inertial integration calculation unit 111 outputs the position/orientation P2 of the wearable device 30 expressed in the global coordinate system, to the wearable device position/orientation integration unit 113.

Similarly, the inertial integration calculation unit 121 acquires acceleration information and angular velocity information from the inertial measurement unit 220 (IMU) of the input/output device 20, and estimates a position and an orientation (hereinafter, also referred to as a "position/orientation P3") of the input/output device 20 on the basis of the acquired acceleration information and angular velocity information. Such a position/orientation P3 is expressed by a global coordinate system. For example, by calculating a position and an orientation of the input/output device 20 by inertial navigation, and correcting a drift error generated at that time by using a regression model, the inertial integration calculation unit 121 can estimate position information and orientation information of the input/output device 20. The inertial integration calculation unit 121 outputs the position/orientation P3 of the input/output device 20 expressed in the global coordinate system, to the wearable device position/orientation integration unit 113.

The wearable device position/orientation integration unit 113 acquires the relative position/orientation P1 (viewed from the imaging unit 201) of the wearable device 30 outputted by the wearable device position/orientation estimation unit 109. Such a position/orientation P1 is expressed by the camera coordinate system with respect to the imaging unit 201 (for example, the imaging unit 201a). Moreover, the wearable device position/orientation integration unit 113 acquires the position/orientation P2 of the inertial measurement unit 303 of the wearable device 30 outputted by the inertial integration calculation unit 111, and the position/orientation P3 of the inertial measurement unit 220 of the input/output device 20 outputted by the inertial integration calculation unit 121. Such positions/orientations P2 and P3 are individually expressed by a global coordinate system.

The wearable device position/orientation integration unit 113 calculates a relative position/orientation of the position/orientation P2 of the wearable device 30 viewed from the position/orientation P3 of the input/output device 20, and calculates a position/orientation (hereinafter, also referred to as a "position/orientation P4") of the wearable device 30 expressed by a coordinate system (for example, a camera coordinate system of the imaging unit 201a) with respect to the imaging unit 201, by using a positional relationship between the IMU and the camera obtained by IMU-camera calibration or the like in advance. The wearable device position/orientation integration unit 113 integrates the position/orientation P1 and the position/orientation P4, and outputs the integrated position/orientation R2 (FIG. 4) to the finger joint recognition integration unit 119. The integrated position/orientation R2 is expressed by a coordinate system (for example, the camera coordinate system of the imaging unit 201a) with respect to the imaging unit 201.

Here, the integration of the position/orientation may be performed in any manner. For example, if the position/orientation P1 estimated by the wearable device position/orientation estimation unit 109 is available (except for a case of indicating impossibility of estimation), the wearable device position/orientation integration unit 113 outputs the position/orientation P1 to the finger joint recognition integration unit 119. Whereas, the wearable device position/orientation integration unit 113 outputs the position/orientation P4 to the finger joint recognition integration unit 119 in a case where impossibility of estimation is outputted from the wearable device position/orientation estimation unit 109.

Note that, here, a case has been mainly assumed in which the wearable device position/orientation integration unit 113 integrates a position/orientation of the wearable device 30 based on an imaging result of an optical marker obtained by the IR imaging unit 201d of the input/output device 20, and a position/orientation of the wearable device 30 based on information outputted from the IMU (of each of the input/output device 20 and the wearable device 30). However, the position/orientation of the wearable device 30 outputted from the wearable device position/orientation integration unit 113 to the finger joint recognition integration unit 119 is not limited to such an example.

For example, among: a position/orientation of the wearable device 30 based on an imaging result of an optical marker; a position/orientation of the wearable device 30 based on information outputted from the IMU; a position/orientation of the wearable device 30 based on magnetic tracking; and a position/orientation of the wearable device 30 based on ultrasonic sensing, the wearable device position/orientation integration unit 113 may output any one or an integration result of at least any two to the finger joint recognition integration unit 119.

By using the position/orientation R2 (FIG. 4) of the wearable device 30 outputted by the wearable device position/orientation integration unit 113, the finger joint recognition integration unit 119 expresses again individual finger joint positions outputted individually by the finger joint recognition unit 115 and the finger joint recognition unit 117 (FIG. 4 illustrates the position/orientation R4 and the position/orientation R6 as examples of the individual finger joint positions) by a coordinate system (for example, the camera coordinate system of the imaging unit 201a) with respect to the imaging unit 201.

Describing with the example illustrated in FIG. 4, by adding the position/orientation R2, the relative position/orientation R3 (as viewed from the wearable device 30) of the imaging unit (palm side) 301, and each finger joint position (the position/orientation R4) outputted by the finger joint recognition unit 115, the finger joint recognition integration unit 119 can express again each finger joint position (the position/orientation R4) by the coordinate system with respect to the imaging unit 201.

Note that, as illustrated in FIG. 4, the imaging unit (palm side) 301 is provided in a controller unit 31, and the position/orientation R3 does not change according to a worn state of the wearable device 30 by the user (since the controller unit 31 is not deformed). Therefore, the position/orientation R3 can be set in advance before the user wears the wearable device 30.

Similarly, by adding the position/orientation R2, the relative position/orientation R5 (as viewed from the wearable device 30) of the imaging unit (hand back side) 302, and each finger joint position (the position/orientation R6) outputted by the finger joint recognition unit 117, the finger joint recognition integration unit 119 can express again each finger joint position (the position/orientation R6) by the coordinate system with respect to the imaging unit 201. Note that, as illustrated in FIG. 4, in a case where the imaging unit (hand back side) 302 is provided in the controller unit 31, the position/orientation R5 does not change according to a worn state of the wearable device 30 by the user (since the controller unit 31 is not deformed). Therefore, the position/orientation R5 can be set in advance before the user wears the wearable device 30.

Here, the present disclosure is not limited to the example in which the imaging unit (palm side) 301 or the imaging unit (hand back side) 302 is fixed to the wearable device 30. For example, a band part 32 or the like may be deformed according to a worn state of the wearable device 30 by the user, and the position/orientation R3 or R5 may be changed. In that case, own positions may be individually estimated using the SLAM for the imaging unit (palm side) 301 and the imaging unit (hand back side) 302, and the position/orientation R3 or R5 may be calculated in real time. Then, the finger joint recognition integration unit 119 integrates individual finger joint positions individually outputted by the finger joint recognition unit 115 and the finger joint recognition unit 117 and each finger joint position outputted by the finger joint recognition unit 103, which are expressed again by a coordinate system with respect to the imaging unit 201 (for example, the camera coordinate system of the imaging unit 201a), by using reliability (described later) of those. The finger joint recognition integration unit 119 outputs each integrated finger joint position to the processing execution unit 105 as a final estimation result of the finger joint position (as a recognition result of the user input).

The processing execution unit 105 is a configuration to execute various functions (for example, an application)

provided by the information processing device 10 (accordingly, the information processing system 1). For example, in accordance with each finger joint position (a recognition result of the user input) outputted from the finger joint recognition integration unit 119, the processing execution unit 105 may extract a corresponding application from a predetermined storage unit (for example, the storage unit 190 to be described later), and execute the extracted application. Alternatively, the processing execution unit 105 may control an operation of the application being executed, in accordance with each finger joint position outputted from the finger joint recognition integration unit 119. For example, the processing execution unit 105 may switch subsequent operations of the application being executed, in accordance with each finger joint position. Alternatively, the processing execution unit 105 may output information indicating execution results of various applications to the output control unit 107.

The output control unit 107 presents information to the user by outputting various types of the information to be an output target, to the output unit 210 and the output unit 310. For example, the output control unit 107 may present display information to the user by causing the display unit 211 to display the display information to be an output target. As an example, on the basis of each finger joint position (that is, a recognition result of a finger) outputted from the finger joint recognition integration unit 119, the output control unit 107 may control the display unit 211 to display a virtual object operable by the user. Alternatively, by causing the audio output unit 213 to output audio corresponding to information to be an output target, the output control unit 107 may present the information to the user. Alternatively, by causing the vibration presentation unit 311 to output vibration according to information to be an output target, the output control unit 107 may present the information to the user.

For example, the output control unit 107 may acquire information indicating execution results of various applications from the processing execution unit 105, and present output information according to the acquired information to the user via the output unit 210. Furthermore, the output control unit 107 may cause the display unit 211 to display display information indicating an execution result of a desired application. Furthermore, the output control unit 107 may cause the audio output unit 213 to output output information according to an execution result of a desired application as audio (including voice). Furthermore, the output control unit 107 may cause the vibration presentation unit 311 to output output information according to an execution result of a desired application as vibration.

The storage unit 190 is a storage area (a recording medium) for temporarily or permanently storing various data (the various data may include a program for causing a computer to function as the information processing device 10). For example, the storage unit 190 may store data for the information processing device 10 to execute various functions. As a more specific example, the storage unit 190 may store data (for example, a library) for executing various applications, management data for managing various settings, and the like.

Note that the functional configuration of the information processing system 1 illustrated in FIG. 5 is merely an example, and the functional configuration of the information processing system 1 is not necessarily limited to the example illustrated in FIG. 5 as long as the processing of each configuration described above can be realized. As a specific example, the input/output device 20 and the information processing device 10 may be integrally configured. Furthermore, as another example, the storage unit 190 may be included in the information processing device 10, and may be configured as a recording medium external to the information processing device 10 (for example, a recording medium externally attached to the information processing device 10). Furthermore, as another example, some configuration among the individual configurations of the information processing device 10 may be provided externally to the information processing device 10 (for example, a server or the like).

An example of the functional configuration of the information processing system 1 according to the present embodiment has been described above with reference to FIG. 5.

5. Reliability of Finger Joint Recognition

Next, with reference to FIGS. 6 to 9, an example of a reliability calculation method according to an embodiment of the present disclosure will be described. Note that, as described above, the reliability is information indicating a possibility of being reliable of each finger joint position recognized by each of the finger joint recognition unit 103, the finger joint recognition unit 115, and the finger joint recognition unit 117 on the basis of a depth image, and the reliability is calculated as a value corresponding to each finger recognition position. The calculation method of the reliability may be similar (or different) among the finger joint recognition unit 103, the finger joint recognition unit 115, and the finger joint recognition unit 117.

Figure 6:
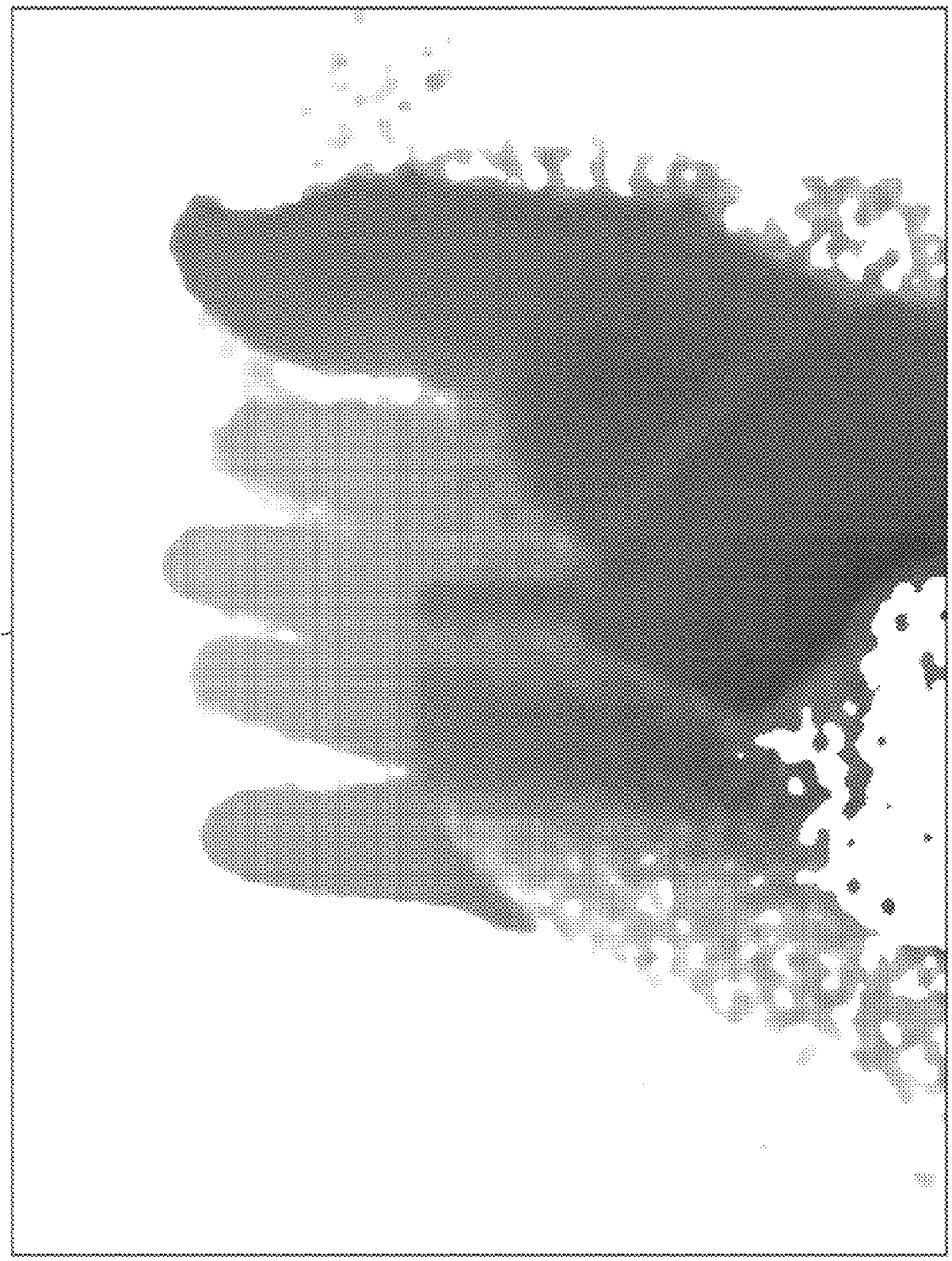
FIG. 6 is a view illustrating an example of a depth image.

FIG. 6 is a view illustrating an example of a depth image. Referring to FIG. 6, a depth image G1 is illustrated as an example. The depth image G1 shows a hand of the user wearing the wearable device 30. In the depth image G1, a position where color blackness is stronger indicates a position where a depth is lower (that is, closer to the camera). Conversely, a position where color whiteness is stronger indicates a position where a depth is higher (that is, farther from the camera).

Figure 7:
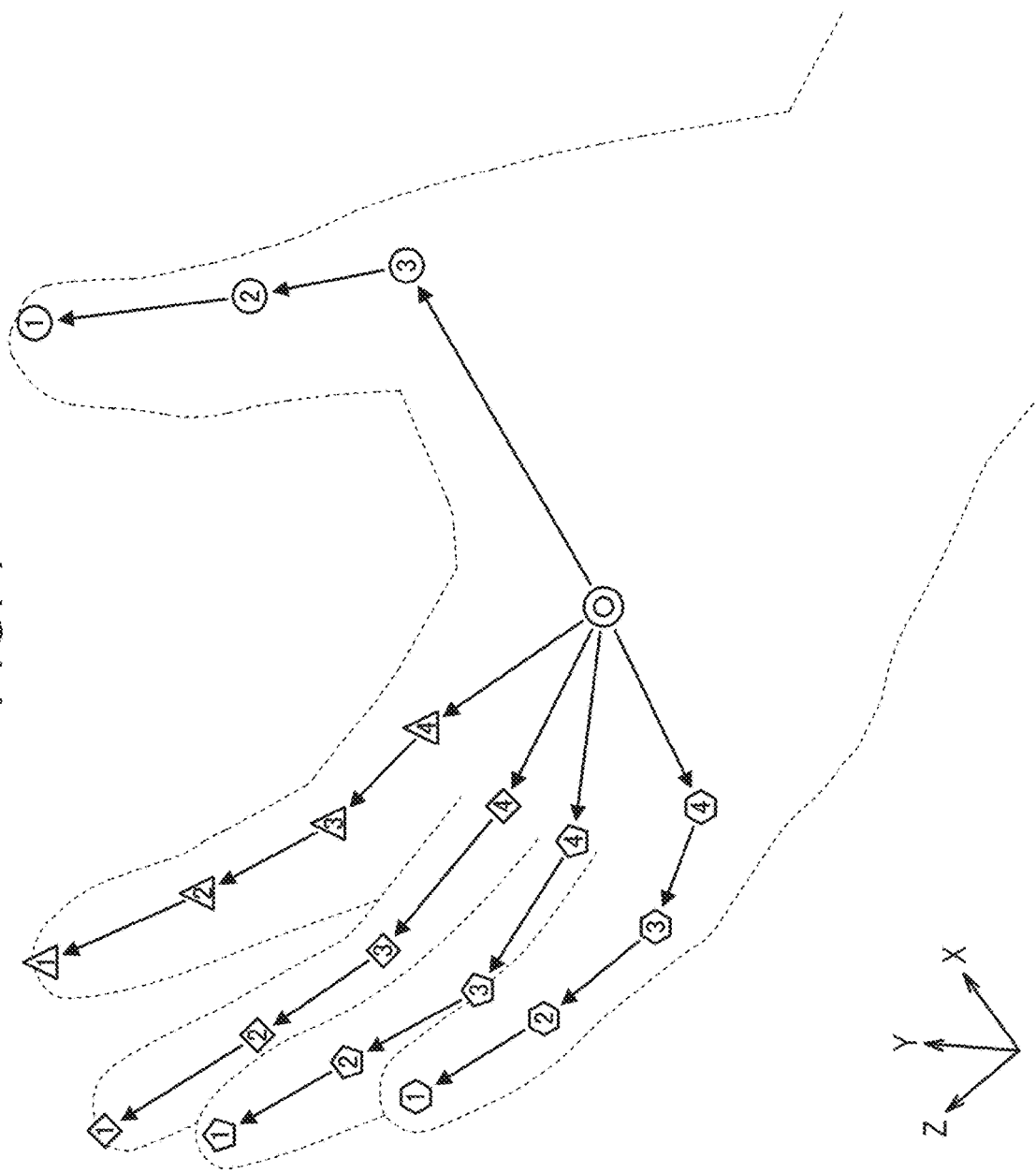
FIG. 7 is a view illustrating an example of a finger joint position.

FIG. 7 is a view illustrating an example of a finger joint position. Referring to FIG. 7, an example of each finger joint position recognized on the basis of a depth image (for example, as in the depth image G1 illustrated in FIG. 6) is three-dimensionally represented. In the example illustrated in FIG. 7, a center position of the palm is indicated by a double circle, each joint position of the thumb is indicated by a circle, each joint position of the index finger is indicated by a triangle, each joint position of the middle finger is indicated by a rhombus, each joint position of the ring finger is indicated by a pentagon, and each joint position of the little finger is indicated by a hexagon. In the numbers in the individual shapes, "1" indicates a fingertip, "2" indicates a center of the first joint, "3" indicates a center of the second joint, and "4" indicates a center of the third joint (excluding the thumb). Coordinates of each finger joint position are represented by a camera coordinate system.

Figure 8:
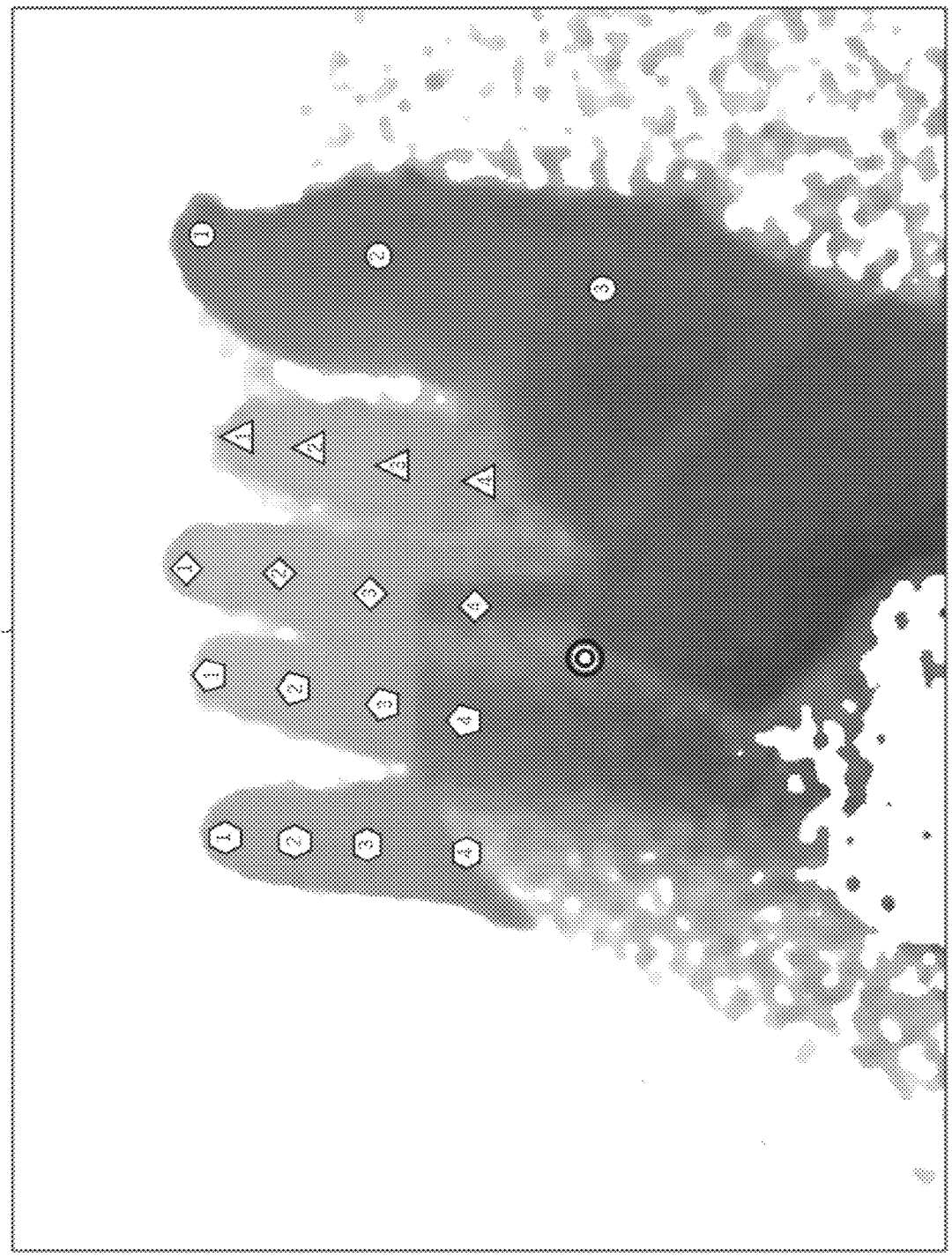
FIG. 8 is a view illustrating an example of an image in which each recognized finger joint position is reprojected on a depth image.

FIG. 8 is a view illustrating an example of an image in which each recognized finger joint position is reprojected on a depth image. Referring to FIG. 8, a reprojection image G2 obtained by reprojecting each recognized finger joint position (for example, as in each joint position illustrated in FIG. 7) onto a depth image (for example, as in the depth image G1 illustrated in FIG. 6) is illustrated. Note that since the camera has obtained an internal parameter and a distortion coefficient by performing camera calibration in advance, conversion from the camera coordinate system to the image coordinate system can be performed using these.

In the camera coordinate system, a front side of the camera (a depth direction of the camera) is defined a z-direction. Here, a pixel value at a position where each recognized finger joint position is reprojected on the depth image represents a distance from the camera, and the distance is defined as V(k). Whereas, a z-coordinate of each recognized finger joint position is defined as Z(k). At this time, Δ(k)=|V(k)−Z(k)|, which is an absolute value of a difference, is defined as an error in the depth direction of the finger joint position. Note that Δ(k) may correspond to an example of an error in the depth direction for every finger joint position.

Then, a root mean square (RMS) of the error in the depth direction of the all finger joints positions can be calculated as D by the following Equation (1). Note that, in Equation (1), n represents the number of finger joints.

[Formula 1]

$$D = \sqrt{\left(\frac{1}{n}\right)\sum (\Delta(k))^2} \quad (1)$$

Then, the reliability of the finger joint can be calculated as 1/(1+D) by using D calculated as in Equation (1). That is, the reliability takes a maximum value 1 when D is 0, and the reliability approaches 0 when the error in the depth direction of each joint increases. Note that 1/(1+D) is merely an example of the reliability of the finger joint position. Therefore, the method of calculating the reliability of the finger joint position is not limited to such an example. For example, the reliability of the finger joint position may simply be calculated so as to decrease as the error in the depth direction of the finger joint position increases.

Figure 9:
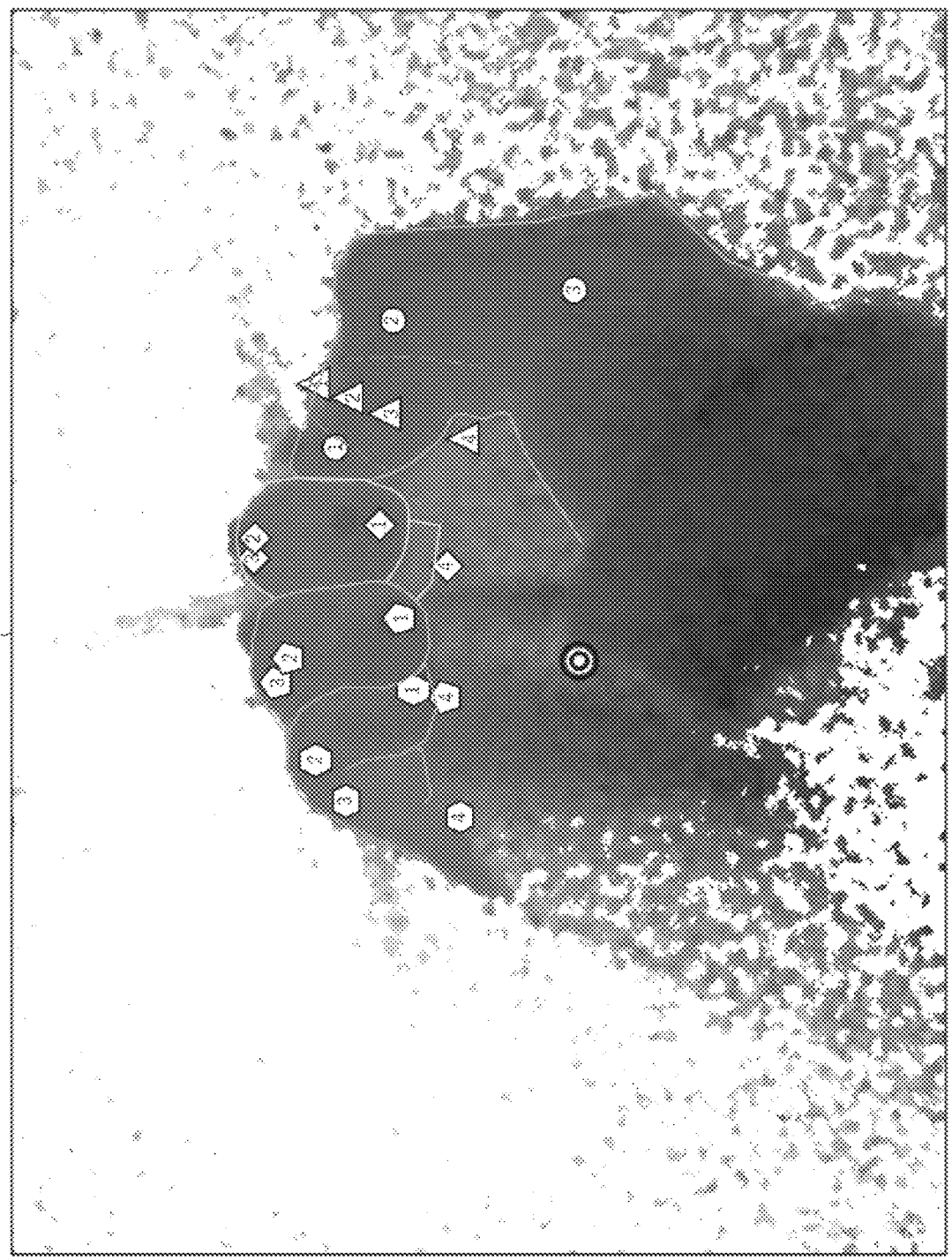
FIG. 9 is a view illustrating another example of an image in which each recognized finger joint position is reprojected on a depth image.

FIG. 9 is a view illustrating another example of an image in which each recognized finger joint position is reprojected on a depth image. Referring to FIG. 9, similarly to the example illustrated in FIG. 8, a reprojection image G3 obtained by reprojecting each recognized finger joint position on a depth image is illustrated. In the reprojection image G3, the index finger is extended and other fingers are bent like clasping. The index finger (the finger having a broken line as a contour line illustrated in FIG. 9) is almost hidden by the thumb and hardly shown in the depth image. Therefore, each joint position of the index finger is recognized to be on a back side of the thumb.

Whereas, the z-coordinate of the position where each joint position of the recognized index finger is reprojected on the depth image is to be a distance from the camera to the surface of the thumb. Therefore, the z-coordinate is to be a shorter value than a distance from the camera to each joint position of the recognized index finger (a distance from the camera to the index finger on the far side of the thumb). Therefore, a difference becomes large between the z-coordinate of each joint position of the recognized index finger and the z-coordinate (a pixel value) of the position where each joint position of the recognized index finger is reprojected on the depth image, and the reliability becomes small.

An example of the reliability calculation method according to an embodiment of the present disclosure has been described above with reference to FIGS. 6 to 9.

6. Notable Features

Next, notable features of an embodiment of the present disclosure will be described. As described above, in the information processing device 10 according to an embodiment of the present disclosure, each finger joint position is recognized. For example, a recognition result of each finger joint position can be used to detect a position of a fingertip. However, a phenomenon in which a certain part of the body is shielded by another part (hereinafter, also referred to as "self-occlusion") may occur. In a situation where self-occlusion has occurred, it can be assumed that recognition accuracy of the finger joint position that has been shielded by the self-occlusion is reduced.

As an example, even if each of the finger joints falls within the imaging range, in a case where a certain finger joint is shielded by self-occlusion, the most probable position among possible positions as the finger joint position is recognized as the finger joint position. For example, in a case where the index finger is completely shielded by another finger, it is unclear whether the index finger is bent or extended. Therefore, even in the same situations, the joint position of the index finger may be recognized as a state where the index finger is bent, or the joint position of the index finger may be recognized as a state where the index finger is extended, so that the recognition accuracy of the finger joint position is not improved.

Therefore, in the following description, a technique capable of suppressing a decrease in recognition accuracy of the finger joint position will be mainly proposed. Note that, in the following description, a case is mainly assumed in which a joint of a certain finger as an example of a recognition target in the user's body is shielded by another finger. In particular, a situation is likely to occur in which, in the imaging range of the imaging unit 301 provided on the palm side, a joint position of a certain finger is shielded by another finger. However, a part where self-occlusion of the user's body occurs is not limited. That is, a part (a first part) on the shielding side and a part (a second part) on the shielded side are not limited. For example, the embodiment of the present disclosure can also be applied to a case where a finger joint as a recognition target is shielded by a part (for example, a palm, an arm, or the like of the user) other than a finger of the user's body.

6.1. Basic Control

Figure 10:
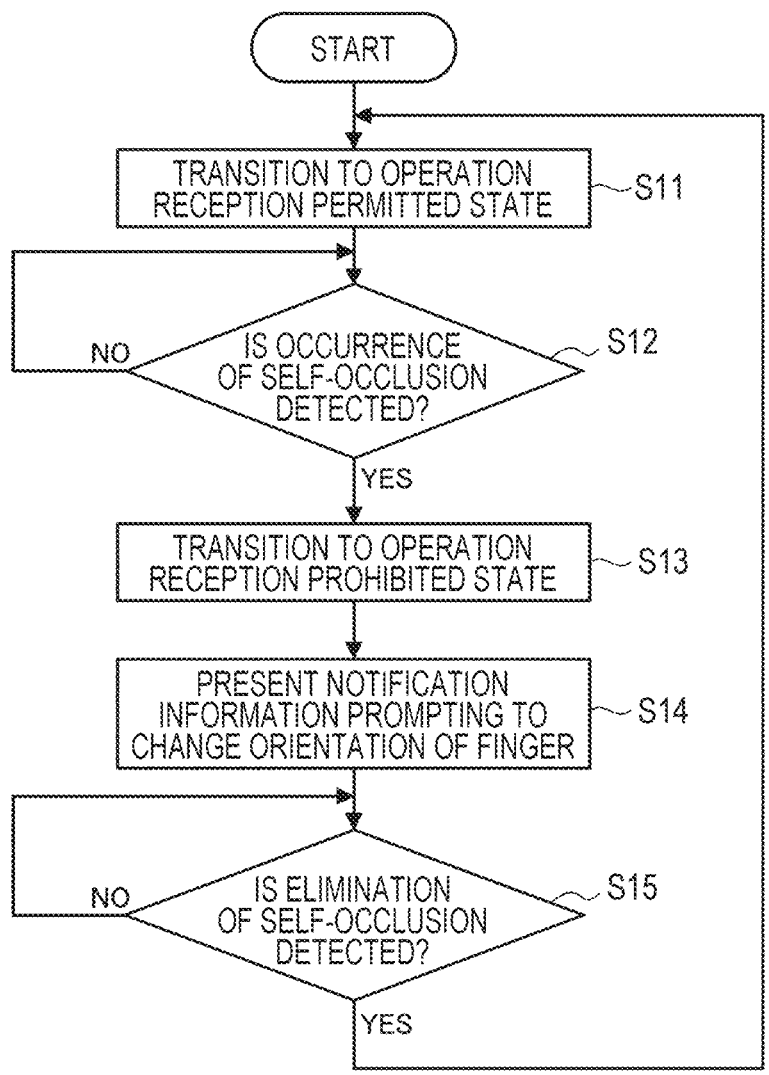
FIG. 10 is a flowchart for explaining an example of basic control according to an embodiment of the present disclosure.

FIG. 10 is a flowchart for explaining an example of basic control according to an embodiment of the present disclosure. As described above, the processing execution unit 105 recognizes an operation inputted by the user on the basis of a finger joint position outputted from the finger joint recognition integration unit 119, and performs processing according to the recognized operation. First, the processing execution unit 105 sets an operation mode to a normal operation mode (hereinafter, the operation mode is also referred to as a "normal operation mode M1"). When the operation mode is set to the normal operation mode M1, the processing execution unit 105 causes a transition to a state where reception of an operation inputted by the user (hereinafter, also referred to as a "user operation") is permitted (S11).

Here, while the processing execution unit 105 does not detect an occurrence of self-occlusion in which a certain finger joint is shielded by another finger ("NO" in S12), S12 is executed again. Whereas, in a case where the processing execution unit 105 detects an occurrence of self-occlusion in which a certain finger joint is shielded by another finger ("YES" in S12), the processing execution unit 105 sets the operation mode to an operation guide mode (hereinafter, also referred to as an "operation guide mode M2").

As an example, the processing execution unit 105 may determine whether or not self-occlusion has occurred in accordance with whether or not reliability of a finger joint position outputted from the finger joint recognition integration unit 119 together with the finger joint position falls below a prescribed threshold value (first reliability). When the operation mode is set to the operation guide mode M2, the processing execution unit 105 causes a transition to a state where reception of a user operation is prohibited (S13). As a result, it is possible to reduce a possibility of an erroneous operation caused by execution of processing according to an operation while the self-occlusion occurs.

Then, the output control unit 107 controls the output unit 210 of the input/output device 20 to present notification information (hereinafter, also referred to as a "guide user interface (UI)") prompting to change an orientation of the finger (S14). Here, the guide UI prompting to change the orientation of the finger is only required to be information prompting to change an orientation of at least any one of a finger having a shielded finger joint or a finger shielding the finger joint. As a result, since the user tries to eliminate the self-occlusion by changing an orientation of at least any one of the fingers, a decrease in recognition accuracy of a finger joint position is expected to be suppressed. Hereinafter, the guide UI prompting the user to change the orientation of the finger is also referred to as a "guide UI prompting the user to open the hand".

While the processing execution unit 105 does not detect elimination of self-occlusion in which the finger joint is shielded by another finger ("NO" in S15), S15 is executed again. Whereas, in a case where elimination of self-occlusion in which the finger joint is shielded by another finger is detected ("YES" in S15), the process returns to S11, and the operation mode is set again to the normal operation mode M1. When the operation mode is set again to the normal operation mode M1, the processing execution unit 105 causes a transition again to a state where reception of a user operation is permitted.

As an example, the processing execution unit 105 may determine whether or not self-occlusion has been eliminated in accordance with whether or not reliability of a finger joint position outputted from the finger joint recognition integration unit 119 together with the finger joint position exceeds a prescribed threshold value (second reliability). Note that the threshold value (the second reliability) for determining whether or not self-occlusion has been eliminated may be the same value as or a different value from the threshold value (the first reliability) for determining whether or not self-occlusion has occurred.

Moreover, in the embodiment of the present disclosure, a case is mainly assumed in which the processing execution unit 105 determines whether or not self-occlusion has occurred by using individual finger joint positions after integration by the finger joint recognition integration unit 119 and the reliability thereof. However, the processing execution unit 105 may determine whether or not self-occlusion has occurred by using each finger joint position outputted by at least one of the finger joint recognition unit 115, the finger joint recognition unit 117, or the finger joint recognition unit 103 and the reliability thereof.

Similarly, the processing execution unit 105 may determine whether or not self-occlusion has been eliminated by using each finger joint position outputted by at least one of the finger joint recognition unit 115, the finger joint recognition unit 117, or the finger joint recognition unit 103 and the reliability thereof.

An example of the basic control according to the embodiment of the present disclosure has been described above.

6.2. Example of Integration of Finger Joint Position and Occlusion Detection Next, with reference to FIGS. 1 to 5, a description will be given to an example of integration of finger joint positions by the finger joint recognition integration unit 119 and an example of self-occlusion detection by the processing execution unit 105.

As described above, the finger joint recognition integration unit 119 adds the position/orientation R2 (FIG. 4) of the wearable device 30 outputted by the wearable device position/orientation integration unit 113, the relative position/orientation R3 (viewed from the wearable device 30) of the imaging unit (palm side) 301, and each finger joint position (the position/orientation R4) outputted by the finger joint recognition unit 115. As a result, the finger joint recognition integration unit 119 represents again each finger joint position (the position/orientation R4) in the coordinate system with respect to the imaging unit 201. The position information for every finger joint after being represented again in the coordinate system with respect to the imaging unit 201 in this manner is set as $Q1(k)$. Here, k represents a number of a finger joint ($k=0, 1, \ldots$).

In addition, the finger joint recognition integration unit 119 obtains reliability $C1(k)$ of each finger joint position from the finger joint recognition unit 115.

The finger joint recognition integration unit 119 adds the position/orientation R2 (FIG. 4) of the wearable device 30 outputted by the wearable device position/orientation integration unit 113, the relative position/orientation R5 (viewed from the wearable device 30) of the imaging unit (hand back side) 302, and each finger joint position (the position/orientation R6) outputted by the finger joint recognition unit 117. As a result, the finger joint recognition integration unit 119 represents again each finger joint position (the position/orientation R6) in the coordinate system with respect to the imaging unit 201. The position information for every finger joint after being represented again in the coordinate system with respect to the imaging unit 201 in this manner is set as $Q2(k)$.

In addition, the finger joint recognition integration unit 119 obtains reliability $C2(k)$ of each finger joint position from the finger joint recognition unit 117.

The finger joint recognition integration unit 119 obtains position information $Q3(k)$ for every finger joint recognized by the finger joint recognition unit 103 on the basis of images individually outputted from the imaging units 201a and 201b of the input/output device 20 worn on the head of the user. Moreover, the finger joint recognition integration unit 119 obtains reliability $C3(k)$ of each finger joint position from the finger joint recognition unit 103.

As an example, the finger joint recognition integration unit 119 obtains $Q(k)$ ($k=0, 1, \ldots$) for every finger joint as follows. That is, the finger joint recognition integration unit 119 sets $Q(k)=Q1(k)$ in a case where reliability $C1(k)$ is larger than a threshold value T1, $Q(k)=Q2(k)$ in other cases and in a case where reliability $C2(k)$ is larger than a threshold value T2, $Q(k)=Q3(k)$ in other cases and in a case where the reliability $C3(k)$ is a threshold value T3, and $Q(k)$=unknown in other cases.

$Q(k)$ obtained by the finger joint recognition integration unit 119 in this manner is outputted to the processing execution unit 105. In the processing execution unit 105, the initial operation mode is set to the normal operation mode M1.

In a case where the operation mode is the normal operation mode M1 and none of Q(k) is "unknown", the processing execution unit 105 continues the normal operation mode M1 as the operation mode (assuming that self-occlusion has not occurred). Whereas, in a case where the operation mode is the normal operation mode M1 and at least one of Q(k) is "unknown", the processing execution unit 105 switches the operation mode to the operation guide mode M2 (assuming that self-occlusion has occurred).

In a case where the operation mode is the operation guide mode M2 and at least one of Q(k) is "unknown", the processing execution unit 105 continues the operation guide mode M2 as the operation mode (assuming that self-occlusion is not eliminated). Whereas, in a case where the operation mode is the operation guide mode M2 and none of Q(k) is "unknown", the processing execution unit 105 switches the operation mode to the normal operation mode M1 (assuming that self-occlusion is eliminated).

In a case where the operation mode is the normal operation mode M1, the processing execution unit 105 permits reception of a user operation. Whereas, in a case where the operation mode is the operation guide mode M2, the processing execution unit 105 prohibits reception of a user operation, and outputs, to the output control unit 107, control information for presenting the guide UI prompting the user to open the hand. The output control unit 107 controls the output unit 210 of the input/output device 20 to present the guide UI prompting the user to open the hand in accordance with a control signal.

As described above, when the finger joint recognition integration unit 119 integrates finger joint positions, the finger joint recognition unit 115 recognizes the finger joint positions on the basis of an image outputted from the imaging unit (palm side) 301. Then, in a case where an occurrence of self-occlusion is detected on the basis of the image outputted from the imaging unit (palm side) 301, the finger joint recognition unit 117 recognizes a finger joint position on the basis of an image outputted from the imaging unit (hand back side) 302. Moreover, in a case where an occurrence of self-occlusion is detected on the basis of an image outputted from the imaging unit (hand back side) 302, the finger joint recognition unit 103 recognizes a finger joint position on the basis of depth images of a field of view of the imaging units 201a and 201b of the input/output device 20 worn on the head.

Then, even if finger joint positions are integrated by the finger joint recognition integration unit 119 in this manner, in a case where self-occlusion occurs and at least one finger joint position is not detected, a transition is made to a state where reception of a user operation is prohibited, and an instruction for taking an orientation of the finger in which self-occlusion is less likely to occur can be presented to the user. Whereas, in a case where self-occlusion is eliminated and all the finger joint positions are detected, the state is returned to a state where reception of the user operation is permitted.

An example of integration of finger joint positions by the finger joint recognition integration unit 119 and an example of self-occlusion detection by the processing execution unit 105 according to the embodiment of the present disclosure have been described above.

6.3. Specific Example of Guide UI

Next, the guide UI prompting the user to open the hand will be described with reference to FIGS. 11 to 16.

Figure 11:
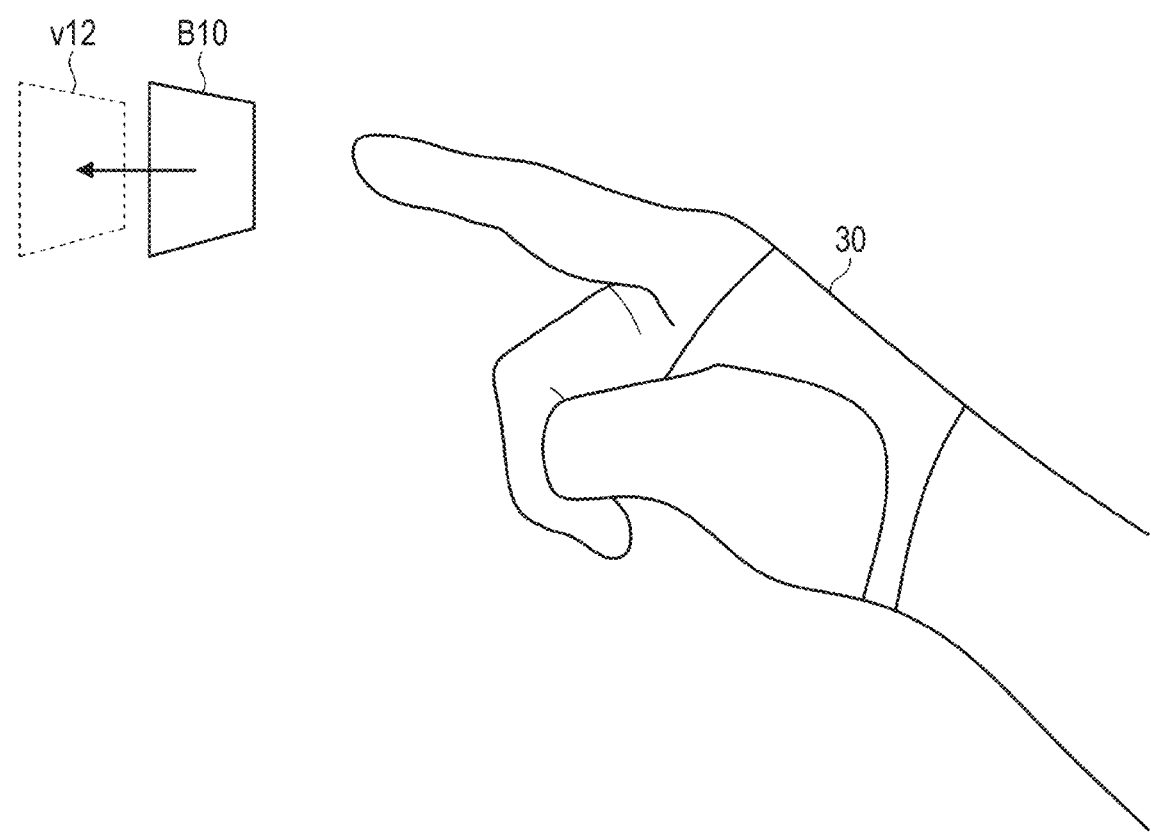
FIG. 11 is a view for explaining an example of a user operation.

FIG. 11 is a view for explaining an example of a user operation. Referring to FIG. 11, a user wearing the wearable device 30 is illustrated. Furthermore, there is a button B10 as an example of an object operable by the user. The button B10 is an example of a virtual object controlled by the output control unit 107 to be displayed by the display unit 211 of the input/output device 20. Note that an object operable by the user may be a virtual object (for example, a thumb of a slider for determining a predetermined position) other than the button B10, or may be a real object.

Hereinafter, a case where the user operation is an operation of pressing the button B10 will be mainly assumed. However, the user operation may be other operations on an object. For example, the user operation may be an operation of moving the thumb of the slider.

In the example illustrated in FIG. 11, a shape of the button B10 is rectangular. However, the shape of the button B10 is not limited. Here, a case is assumed in which an operation associated with the button B10 is executed by the processing execution unit 105 when the button B10 moves on the basis of a user operation of pressing the button B10 in a direction perpendicular to a surface (a rectangular region) of the button B10, and the moved button B10 reaches a rectangular region v12.

Note that, here, a case is assumed in which the user operation of pressing the button B10 is performed by the fingertip of the index finger. At this time, self-occlusion may occur in which the fingertip of the index finger is shielded by another finger (for example, the thumb, the middle finger, the ring finger, or the little finger), a palm, or an arm. However, a user operation of pressing the button B10 may be performed by a part other than the fingertip of the index finger.

As an example, the user operation of pressing the button B10 is performed as follows. First, a virtual plane including the surface (the rectangular region) of the button B10 is assumed. Then, an initial state is defined as a state where a projection position of a fingertip position of the index finger on the virtual plane obtained by the finger joint recognition integration unit 119 is included in the surface (the rectangular region) of the button B10 and where a distance between the fingertip position of the index finger and the virtual plane is within a prescribed threshold value.

For example, the output control unit 107 may give predetermined feedback (for example, visual feedback such as changing a color or texture of the button B10, auditory feedback such as reproducing prescribed sound, haptic feedback by vibration presentation, and the like) to the user when the projection position of the fingertip position of the index finger on the virtual plane is included in the surface (the rectangular region) of the button B10.

Then, an end state is defined as a state (for example, a state where the distance between the fingertip position of the index finger and the virtual plane becomes a prescribed value with respect to a direction of an arrow) where the fingertip position of the index finger has moved by a prescribed distance with respect to the direction of the arrow (a direction from the button B10 toward the rectangular region v12) while a "first condition" that the projection position of the fingertip position of the index finger on the virtual plane is included in the surface (the rectangular region) of the button B10 and a "second condition" that the fingertip position of the index finger does not exceed a prescribed speed are both satisfied with the initial state as a reference.

Note that a display mode (for example, the color and the like) of the button B10 may be changed according to a moving amount of the fingertip position of the index finger. Furthermore, the "second condition" is a condition provided to prevent the button B10 from being moved in a case where the user erroneously touches the button B10 when extending the hand. Therefore, if it is not necessary to consider a possibility of an erroneous operation by the user, the "second condition" may not be considered.

When the end state is reached, the operation of pressing the button B10 by the user is completed, and the processing execution unit 105 executes the operation associated with the button B10. Whereas, in a case where at least any one of the first condition or the second condition is not satisfied before the end state is reached, the processing execution unit 105 cancels the operation of pressing the button B10 by the user (that is, the position of the button B10 is returned to an original position). Furthermore, in a case where reliability of a fingertip position of the index finger falls below a predetermined threshold value before the end state is reached or before the operation is canceled, the processing execution unit 105 causes a transition to a state where reception of the operation of pressing the button B10 is prohibited, and the output control unit 107 controls the display unit 211 to display the guide UI prompting the user to open the hand.

First Example

Figure 12:
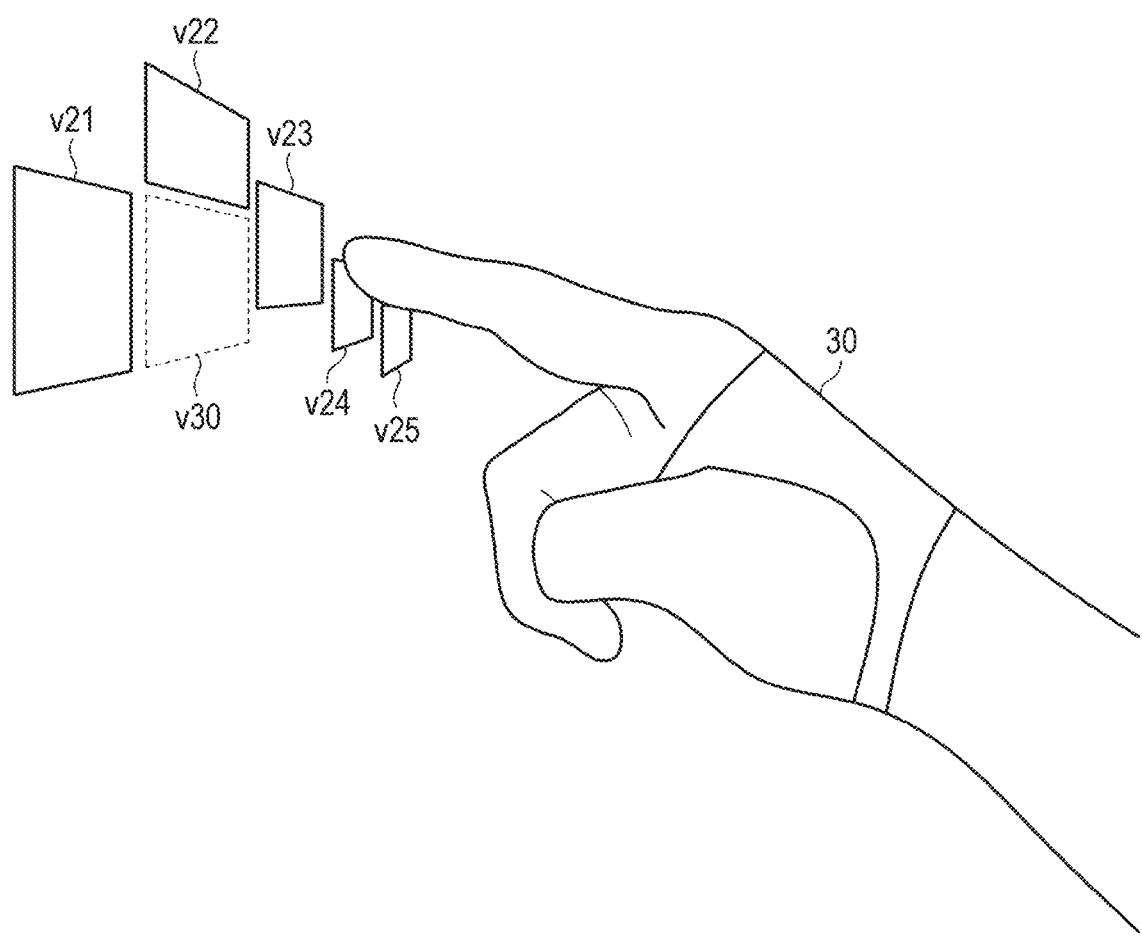
FIG. 12 is a view for explaining a first example of a guide UI prompting a user to open a hand.

FIG. 12 is a view for explaining a first example of the guide UI prompting the user to open the hand. Referring to FIG. 12, a rectangular region v30 is illustrated. The rectangular region v30 indicates the position of the button B10 in the initial state. In a case where reliability of a fingertip position of the index finger falls below a predetermined threshold value, the output control unit 107 desirably prohibits reception of the operation of pressing the button B10 and stops the display of the button B10. As a result, a possibility that the user continues to close the hand to press the button B10 is reduced. Then, the output control unit 107 controls the display unit 211 to display virtual objects v21 to v25 (first virtual objects) as examples of the guide UI.

The virtual objects v21 to v25 include a region away from a position of the rectangular region v30 as an example of a predetermined reference position. As a result, it is possible to prompt the user viewing the virtual objects v21 to v25 to open the hand. In particular, the example illustrated in FIG. 12 is an example in which the separated virtual objects v21 to v25 are displayed individually in five regions away from the rectangular region v30. Note that the virtual objects v21 to v25 are desirably displayed at positions simultaneously touched by the thumb, the index finger, the middle finger, the ring finger, and the little finger, respectively. As a result, it is expected that the user's hand opens when the user attempts to simultaneously touch the virtual objects v21 to v25 with the thumb, the index finger, the middle finger, the ring finger, and the little finger, respectively. A shape of each of the virtual objects v21 to v25 is not limited to a rectangle.

The number of virtual objects may not be five. For example, the number of virtual objects may be a plurality (for example, two, three, or four) other than five, or may be one as described later. However, since there is a high possibility that the fingertip position of the index finger is shielded by a finger (that is, the thumb and the middle finger) adjacent to the index finger, it is desirable that the virtual object is preferentially displayed at a position to be simultaneously touched by the fingertips of the thumb and the middle finger which are the fingers on the shielding side and the fingertip of the index finger which is the shielded side.

The processing execution unit 105 may detect whether or not a finger touches at least some of the virtual objects v21 to v25. In a case where it is detected that a finger touches at least some of the virtual objects v21 to v25, the output control unit 107 may give predetermined feedback (for example, visual feedback such as changing a color or texture of the virtual object touched by the finger, auditory feedback such as reproducing prescribed sound, haptic feedback by vibration presentation, and the like) to the user.

Then, in a case where reliability of the fingertip position of the index finger exceeds a predetermined threshold value, the processing execution unit 105 causes a transition to a state where reception of the operation of pressing the button B10 is permitted, and the output control unit 107 controls the display unit 211 to stop display of the guide UI and resume the display of the button B10. As a result, the user can resume the operation of pressing the button B10.

Note that a position at which the button B10 is displayed again is not particularly limited. As an example, the position where the button B10 is displayed again may be a position of the button B10 at a time point when prohibiting of reception of the user operation is started. However, in a case of operating an object for which processing by the processing execution unit 105 is not executed until reaching the end state, such as the button B10, it is considered desirable that the position at which the object is displayed again is an initial position of the object.

Whereas, a case is also assumed in which the processing executed by the processing execution unit 105 changes in accordance with a position of an object operated by the user, such as a thumb of a slider. In such a case, since it is assumed that the user wants to input an operation from continuation of an already inputted operation, it is considered desirable that the position at which the object is displayed again is a position of the object at the time when prohibiting of reception of the user operation is started.

Modification of First Example

Figure 13:
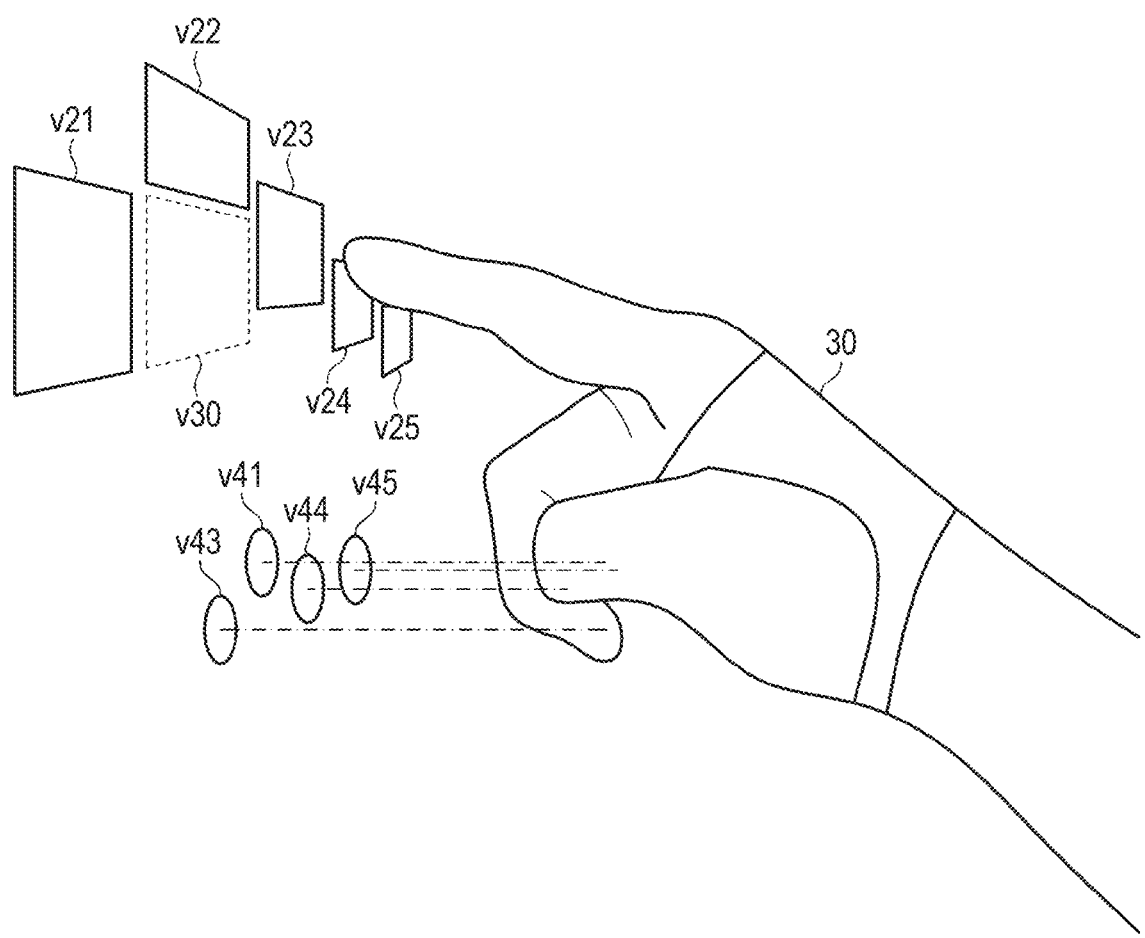
FIG. 13 is a view for explaining a modification of the first example of the guide UI prompting the user to open the hand.
Figure 14:
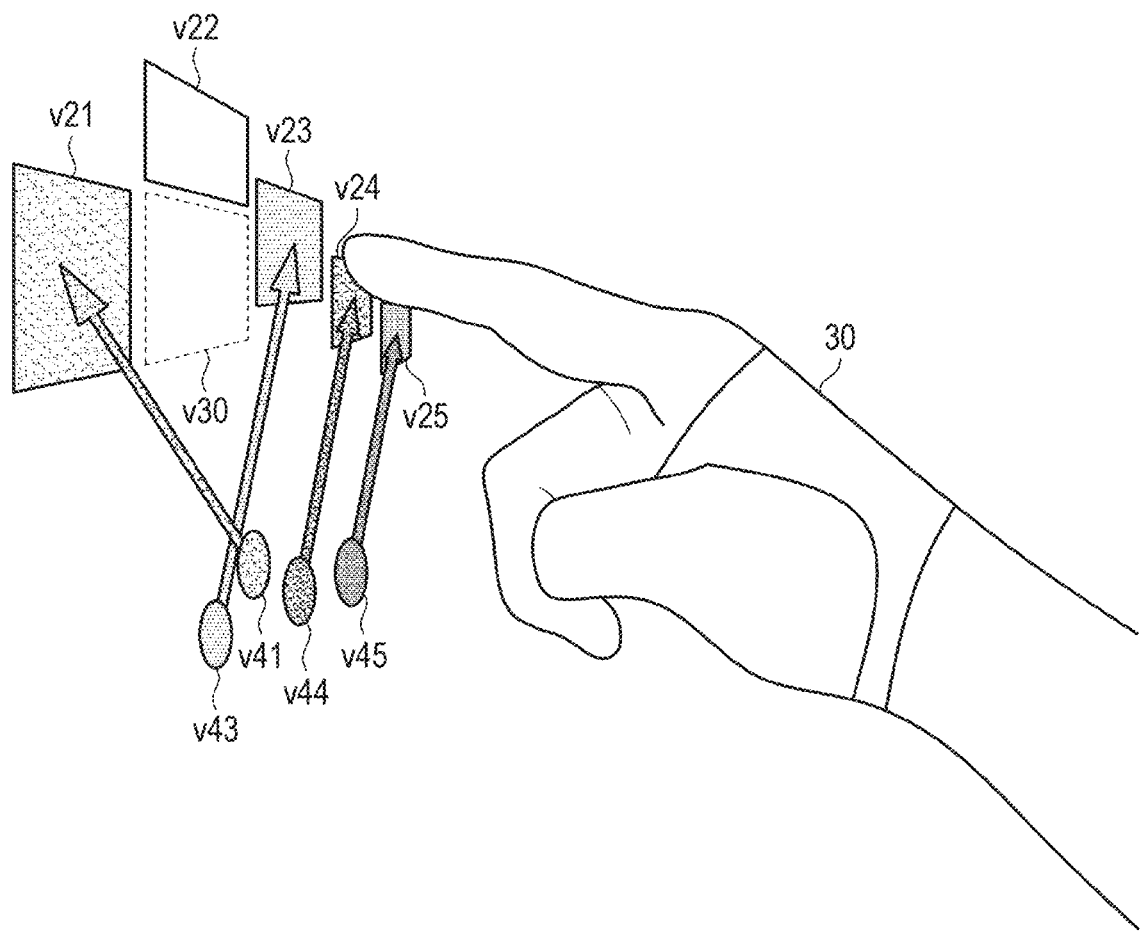
FIG. 14 is a view for explaining a modification of the first example of the guide UI prompting the user to open the hand.

FIGS. 13 and 14 are views for explaining a modification of the first example of the guide UI prompting the user to open the hand. Referring to FIG. 13, similarly to the example illustrated in FIG. 12, the virtual objects v21 to v25 are displayed as examples of the guide UI also in the modification. As described above, the virtual objects v21 to v25 are virtual objects assumed to be simultaneously touched by the thumb, the index finger, the middle finger, the ring finger, and the little finger. Here, if a current position of a fingertip of a finger (that is, the thumb, the middle finger, the ring finger, and the little finger) that can shield the fingertip position of the index finger is presented to the user, it is conceivable that the user can easily change the orientation of the finger.

Therefore, in the modification, the output control unit 107 controls the display unit 211 to present virtual objects v41, v43 to v45 (second virtual objects) corresponding to the fingertip positions of these fingers (that is, the thumb, the middle finger, the ring finger, and the little finger) that can shield the fingertip position of the index finger. For example, as illustrated in FIG. 13, the display positions of the virtual objects v41, v43 to v45 may be projection positions of the fingertip positions of the fingers (the thumb, the middle finger, the ring finger, and the little finger) onto a virtual plane including the rectangular region v30. Furthermore, shapes of the virtual objects v41, v43 to v45 are not limited to circles. Note that, since the fingertip position of the index finger is unknown, the virtual object corresponding to the fingertip position of the index finger does not need to be displayed.

The number of virtual objects according to the fingertip positions of the fingers may not be four. For example, the number of virtual objects according to the fingertip positions of the fingers may be a plurality (for example, two or three) other than four, or may be one. However, since there is a high possibility that the fingertip position of the index finger is shielded by a finger (that is, the thumb and the middle finger) adjacent to the index finger, it is desirable that the virtual objects corresponding to the individual fingertips of the thumb and the middle finger are preferentially displayed. Alternatively, the virtual object corresponding to the fingertip of the finger actually shielding the fingertip of the index finger may be displayed.

Moreover, it is conceivable that the user can easily grasp how to change an orientation of each finger, by instructing the user a direction in which each finger should be moved. Therefore, it is desirable that the output control unit 107 controls the display unit 211 to present information indicating directions corresponding to the positions of the virtual objects v21, v23 to v25 as examples of the guide UI and the positions of the virtual objects v41, v43 to v45 corresponding to the fingertip positions.

Referring to FIG. 14, an arrow directed from the virtual object v41 corresponding to the fingertip position of the thumb toward the virtual object v21 corresponding to the thumb is presented. Similarly, an arrow directed from the virtual object v43 corresponding to the fingertip position of the middle finger toward the virtual object v23 corresponding to the middle finger is presented. Furthermore, an arrow directed from the virtual object v44 corresponding to the fingertip position of the ring finger toward the virtual object v24 corresponding to the ring finger is presented. Moreover, an arrow directed from the virtual object v45 corresponding to the fingertip position of the little finger toward the virtual object v25 corresponding to the little finger is presented.

Moreover, as illustrated in FIG. 14, a first display mode (for example, red) of the virtual objects v41 and v21 and the arrow corresponding thereto, a second display mode (for example, brown) of the virtual objects v43 and v23 and the arrow corresponding thereto, a third display mode (for example, green) of the virtual objects v44 and v24 and the arrow corresponding thereto, and a fourth display mode (for example, purple) of the virtual objects v45 and v25 and the arrow corresponding thereto are desirably different. As a result, a correspondence between the virtual object as an example of the guide UI and the virtual object corresponding to the fingertip position can be easily grasped.

Second Example

Figure 15:
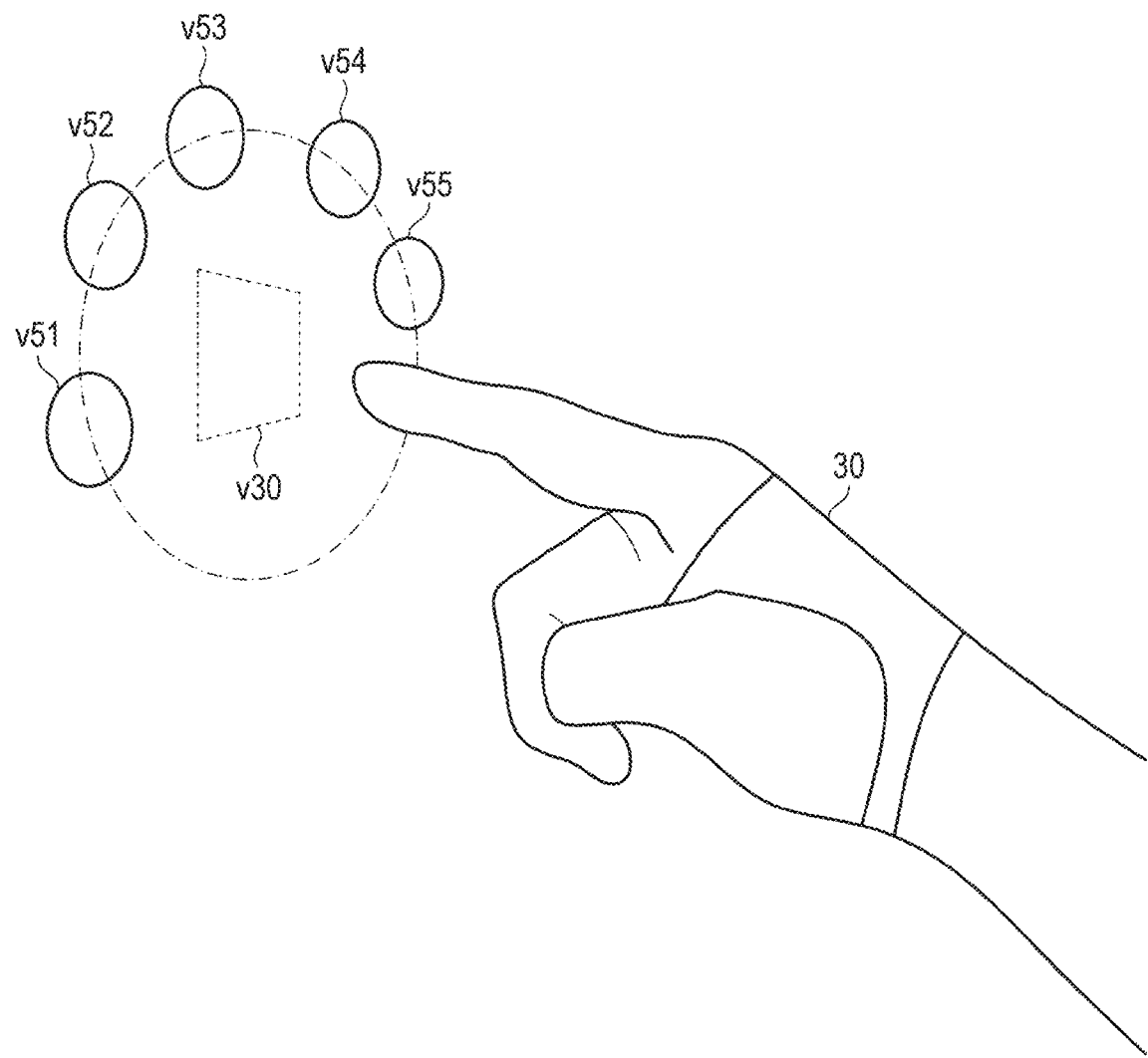
FIG. 15 is a view for explaining a second example of the guide UI prompting the user to open the hand.

FIG. 15 is a view for explaining a second example of the guide UI prompting the user to open the hand. In the example illustrated in FIG. 15, unlike the example illustrated in FIG. 12, virtual objects v51 to v55 as examples of the guide UI are arranged on a circumference centered on the rectangular region v30. In this manner, positions at which the virtual objects v51 to v55 as examples of the guide UI are arranged are not limited. Furthermore, in the example illustrated in FIG. 15, a shape of each of the virtual objects v51 to v55 as examples of the guide UI is circular, unlike the example illustrated in FIG. 12. In this manner, the shape of each of the virtual objects v51 to v55 as examples of the guide UI is also not limited.

Third Example

Figure 16:
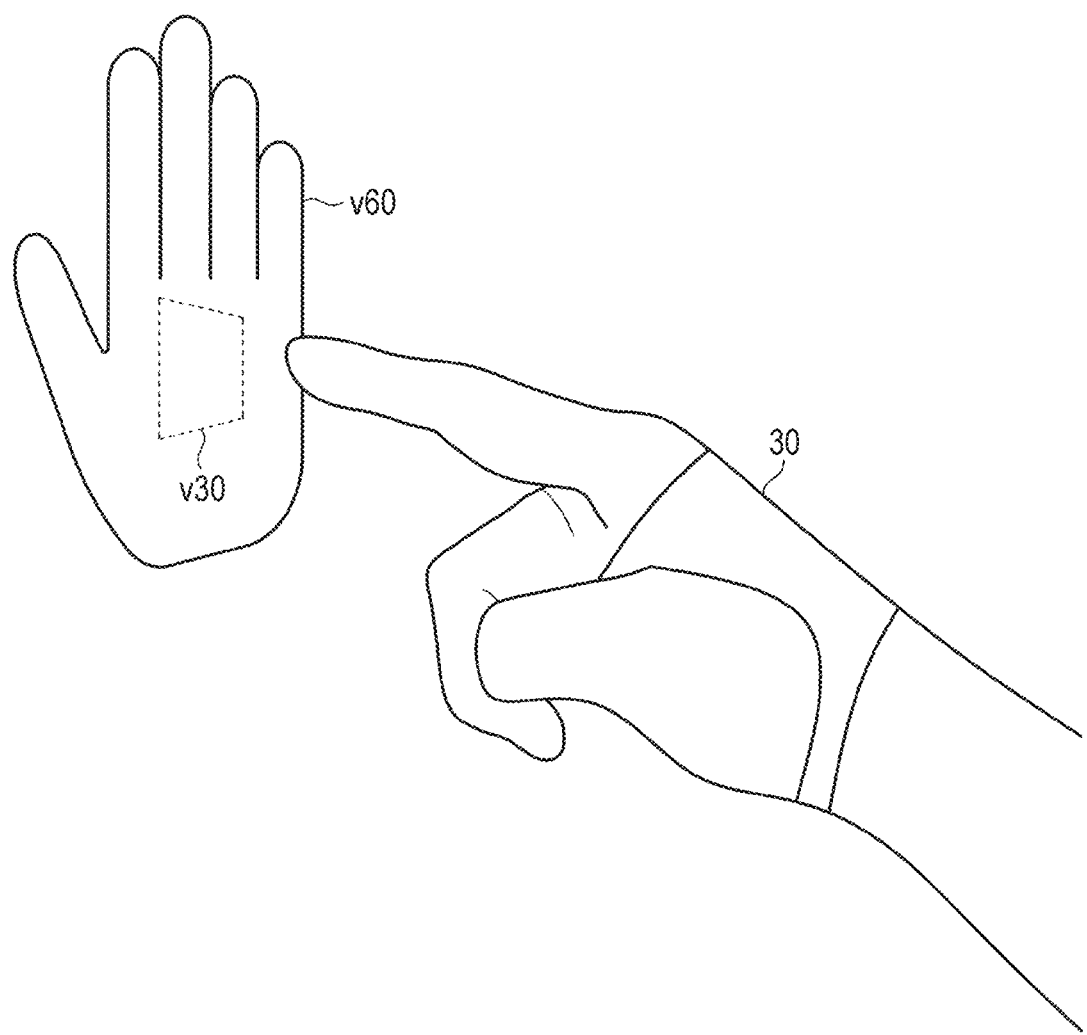
FIG. 16 is a view for explaining a third example of the guide UI prompting the user to open the hand.

FIG. 16 is a view for explaining a third example of the guide UI prompting the user to open the hand. In the example illustrated in FIG. 16, unlike the examples illustrated in FIGS. 12 and 15, one virtual object v60 as an example of the guide UI is arranged. The virtual object v60 includes a region away from the rectangular region v30. In this manner, the number of virtual objects as an example of the guide UI may be one. As an example, the virtual object v60 may be a virtual object including the rectangular region v30 and having a larger size than the rectangular region v30. As illustrated in FIG. 16, a shape of the virtual object v60 may be a shape of a hand in an opened state.

(Reference Position of Virtual Object)

In each of the examples described above, a case has been mainly assumed in which a reference position of the virtual object displayed as an example of the guide UI is a position of the button B10 (a position of the rectangular region v30) as an example of an object operable by the user. However, the reference position of the virtual object displayed as an example of the guide UI is not limited to such an example. For example, the reference position of the virtual object displayed as an example of the guide UI may be a position of the wearable device 30 outputted from the wearable device position/orientation integration unit 113.

(Attribute Change of Button)

In each of the examples described above, a case has been mainly assumed in which a transition is made to a state where reception of a user operation is prohibited in a case where self-occlusion has occurred, and a transition is made to a state where reception of a user operation is permitted in a case where self-occlusion is eliminated. However, in a case where self-occlusion occurs, the output control unit 107 may change an attribute of the button B10 while reception of the user operation is permitted. At this time, an example of the guide UI may include changing of the attribute of the button B10. As a result, the user is expected to change an orientation of at least any one of the fingers, eliminate self-occlusion, and then perform the operation of pressing the button B10, and thus, it is expected that a decrease in recognition accuracy of the finger joint position is suppressed, similarly to each example described above.

Figure 17:
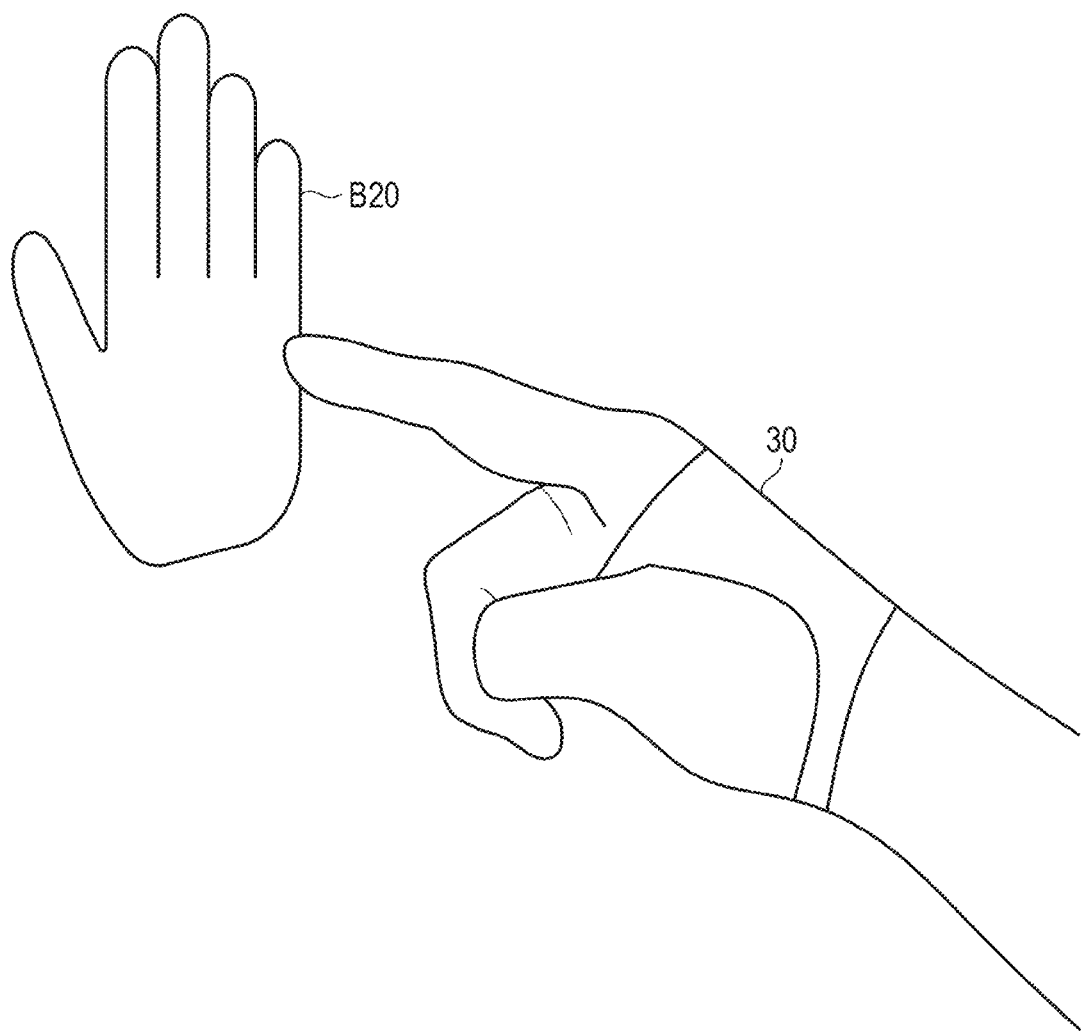
FIG. 17 is a view illustrating an example of changing an attribute of a button.

FIG. 17 is a view illustrating an example of changing the attribute of the button B10. Referring to FIG. 17, a button B20 after the attribute change is illustrated. The button B20 after the attribute change is larger in size than the button B10 before the attribute change. That is, the guide UI may include increasing of a size of the button B10 as the attribute of the button B10. As an example, the button B20 after the attribute change may include the button B10 before the attribute change and have a larger size than the button B10. Note that the attribute change is not limited to the size change, and may include a shape change and the like. Furthermore, as illustrated in FIG. 17, a shape of the button B20 after the attribute change may be a shape of a hand in an opened state. As a result, it is considered that the user is to press the button B20 by opening and overlapping the palm on the button B20.

(Addition of Guide UI)

In the example described above, even if self-occlusion occurs, the guide UI is presented, and the user opens the hand to eliminate the self-occlusion, it can be assumed that the user closes the hand again in order to press the button B10 with the fingertip to cause the self-occlusion again. At this time, the guide UI is repeatedly displayed. Therefore, for example, the output control unit 107 may increase an information amount of the guide UI in a case where a predetermined condition is satisfied.

For example, a case is assumed in which an occurrence of self-occlusion is detected again within a predetermined time (for example, within 30 seconds or the like) after the guide UI is displayed on the basis of the detection of the occurrence of self-occlusion. In such a case, the output control unit 107 may increase the information amount of the guide UI on the basis of the detection of the occurrence of self-occlusion again by the processing execution unit 105 within the predetermined time from the display of the guide UI.

Alternatively, a case is also assumed in which an occurrence of self-occlusion is detected more than a predetermined number of times within a predetermined time range (for example, three or more times within one minute, or the like). In such a case, the output control unit 107 may increase the information amount of the guide UI on the basis of the processing execution unit 105 detecting the occurrence of self-occlusion more than the predetermined number of times within the predetermined time range.

For example, the output control unit 107 may increase the information amount of the guide UI by controlling the display unit 211 to display text (for example, text such as "press the button while keeping the hand open") prompting to change an orientation of a finger as an additional guide UI. Alternatively, the output control unit 107 may increase the information amount of the guide UI by controlling the audio output unit 213 to present voice guidance (for example, voice guidance such as "please operate without closing the hand") prompting to change an orientation of a finger as an additional guide UI.

At this time, the output control unit 107 may increase the information amount of the guide UI according to the number of occurrences of self-occlusion detected within the predetermined time range.

For example, the output control unit 107 may cause text to be presented as an additional guide UI on the basis of the processing execution unit 105 detecting an occurrence of self-occlusion a first number of times (for example, two times) within a predetermined time range (for example, within one minute), may cause text and voice guidance to be presented as an additional guide UI on the basis of detection of a second number of times (for example, three times), and may reproduce a moving image or animation for explaining how to perform the operation by the user as an additional guide UI on the basis of detection of a third number of times (for example, four times).

Another Example of Guide UI

In the example described above, display of a virtual object, attribute change of a button, and the like are mainly assumed as examples of the guide UI. However, the guide UI is not limited to such an example. For example, the output control unit 107 may control the display unit 211 to display text prompting to change an orientation of a finger (for example, text such as "press the button while keeping the hand open") as an example of the guide UI on the basis of the processing execution unit 105 detecting an occurrence of self-occlusion. Alternatively, the output control unit 107 may control the display unit 211 to display voice guidance (for example, voice guidance such as "please operate without closing the hand") prompting to change an orientation of a finger as an example of the guide UI on the basis of the processing execution unit 105 detecting an occurrence of self-occlusion.

A specific example of the guide UI has been described above.

6.4. Various Modifications

Next, various modifications according to the embodiment of the present disclosure will be described.

(Camera for Obtaining Position/Orientation of Hand)

In the example described above, a case is mainly assumed in which a position and an orientation (that is, a position/orientation of the wearable device 30) of a hand are recognized on the basis of an image captured by the IR imaging unit 201d provided in the input/output device 20 worn on the head of the user. However, the position/orientation of the hand may be recognized on the basis of an image captured by another camera. For example, the position/orientation of the hand may be recognized on the basis of an image captured by a camera of the smartphone. Alternatively, the position/orientation of the hand may be recognized on the basis of an image captured by a camera installed in an environment.

(Display Restriction of Guide UI)

In the example described above, a case has been mainly assumed in which the guide UI is unconditionally displayed in a case where an occurrence of self-occlusion is detected. However, even in a case where the occurrence of self-occlusion is detected, there may be a case where the guide UI is not displayed. As an example, in a case where the user holds some object (for example, a ball, a rod, or the like) in the hand, the fingertip position is shielded by the object, but the guide UI may not be displayed in such a case. Whether or not the user holds an object in the hand may be estimated by image recognition (for example, image recognition based on a learned model by machine learning) based on a captured image by the imaging unit (palm side) 301 or the like.

Furthermore, as another example, a case is assumed in which the user is not looking at an object (for example, a button or the like) operable by the user, or a case where a hand is not in a field of view of the IR imaging unit 201d of the input/output device 20 worn on the head of the user. In such a case, since it is considered that the user is not trying to operate the object, the guide UI may not be displayed. That is, the output control unit 107 may control the display unit 211 to display the guide UI in a case where a line-of-sight recognized on the basis of images captured by the imaging units 203a and 203b hits the object and the wearable device 30 is recognized on the basis of an image captured by the IR imaging unit 201d.

Moreover, in the example described above, a case has been mainly assumed in which the guide UI is displayed unless an occurrence of self-occlusion is eliminated. However, in a case where the user cannot open the hand even if the guide UI is displayed, it is also assumed that the state where self-occlusion is not eliminated continues. Therefore, the output control unit 107 may stop the display of the guide UI in a case where a predetermined time has elapsed while elimination of self-occlusion is not detected after the display of the guide UI. However, since a fingertip position is still not recognized with high accuracy, it is desirable to continuously maintain the state where reception of a user operation is prohibited.

(UI Switching Timing)

In the example described above, a case has been mainly assumed in which the guide UI is displayed after reliability of a fingertip position of the index finger falls below a predetermined threshold value. However, the processing execution unit 105 may predict (extrapolate) reliability of the fingertip position of the index finger in time series, and the output control unit 107 may control the display unit 211 to display the guide UI when the predicted reliability falls below the threshold value. Alternatively, the output control unit 107 may start fade-out of the object (a button or the like) and start fade-in of the guide UI at a stage where the reliability falls below a value larger than the threshold value, and may completely switch from the object (a button or the like) to the guide UI at a stage where the reliability falls below the threshold value.

The notable features of an embodiment of the present disclosure have been described above.

7. Hardware Configuration Example

Figure 18:
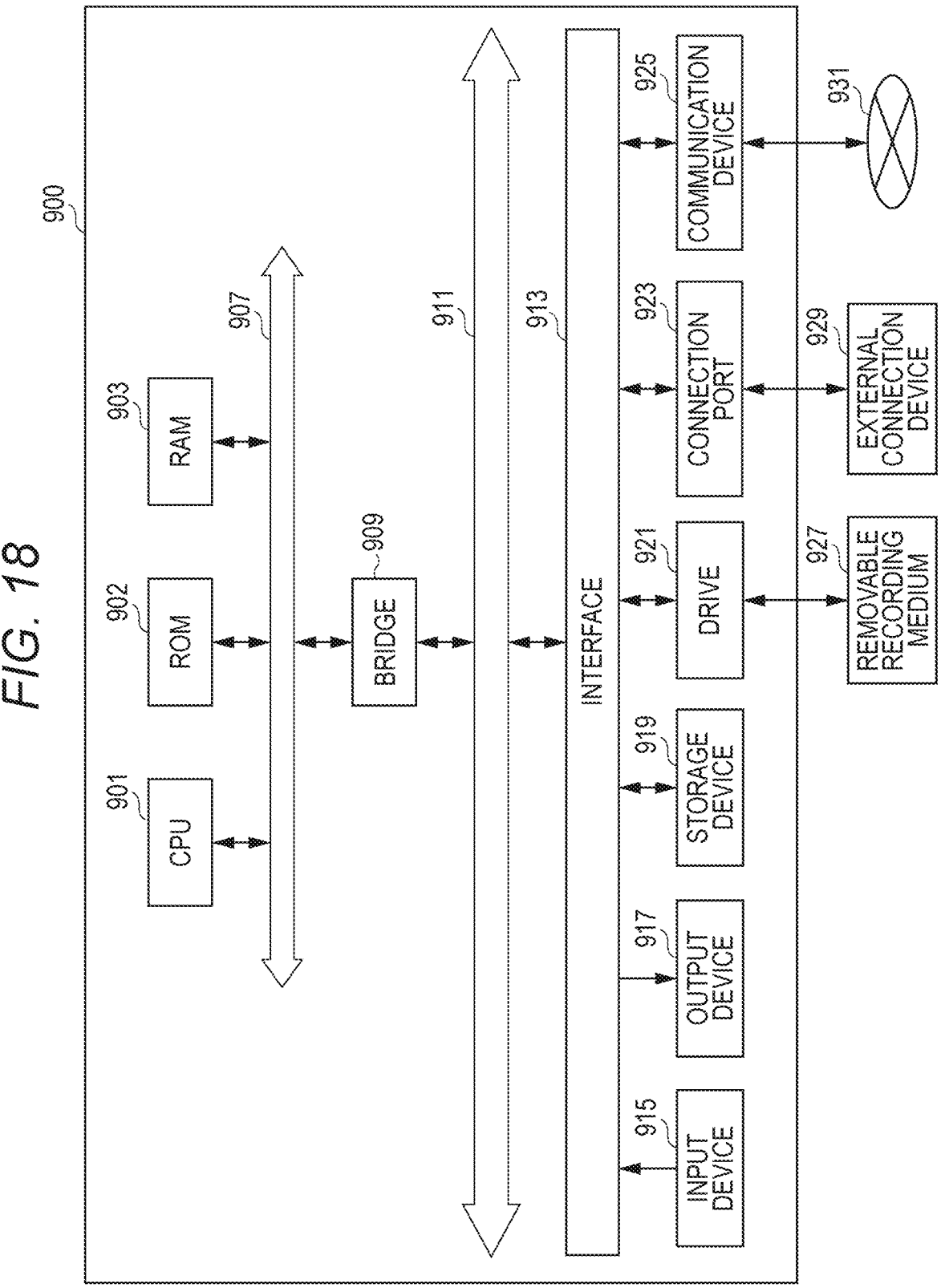
FIG. 18 is a diagram illustrating an example of a hardware configuration of various information processing devices constituting the information processing system according to an embodiment of the present disclosure.

Next, with reference to FIG. 18, a detailed description will be given to an example of a hardware configuration of various information processing devices constituting the information processing system 1 according to an embodiment of the present disclosure, as in the information processing device 10, the input/output device 20, and the wearable device 30 described above. FIG. 18 is a functional block diagram illustrating a configuration example of a hardware configuration of various information processing devices constituting the information processing system 1 according to an embodiment of the present disclosure.

An information processing device 900 constituting the information processing system 1 according to the present embodiment mainly includes a central processing unit (CPU) 901, a read only memory (ROM) 902, and a random access memory (RAM) 903. Furthermore, the information processing device 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls an overall operation or a part thereof in the information processing device 900, in accordance with various programs recorded in the ROM 902, the RAM 903, the storage device 919, or a removable recording medium 927. The ROM 902 stores a program, operation parameters, and the like used by the CPU 901. The RAM 903 primarily stores a program used by the CPU 901, parameters that appropriately change in execution of the program, and the like. These are mutually connected by the host bus 907 including an internal bus such as a CPU bus. For example, each block included in the information processing device 10 illustrated in FIG. 5 can be configured by the CPU 901.

The host bus 907 is connected to the external bus 911 such as a peripheral component interconnect/interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation means operated by the user, such as, for example, a mouse, a keyboard, a touch panel, a button, a switch, a lever, and a pedal. Furthermore, the input device 915 may be, for example, a remote control means (a so-called remote controller) using infrared rays or other radio waves, or an external connection device 929 such as a mobile phone or a PDA corresponding to an operation of the information processing device 900. Moreover, the input device 915 includes, for example, an input control circuit or the like that generates an input signal on the basis of information inputted by the user using the above-described operation means and outputs the input signal to the CPU 901. By operating the input device 915, the user of the information processing device 900 can input various types of data or give an instruction for performing a processing operation, to the information processing device 900.

The output device 917 includes a device capable of visually or auditorily notifying the user of acquired information. Examples of such a device include a display device such as a CRT display device, a liquid crystal display device, a plasma display device, an EL display device, and a lamp, a voice output device such as a speaker and a headphone, a printer device, and the like. The output device 917 outputs, for example, results obtained by various types of processing performed by the information processing device 900. Specifically, the display device displays results obtained by various types of processing performed by the information processing device 900 as text or images. Whereas, a voice output device converts an audio signal including reproduced voice data, audio data, or the like into an analog signal and outputs the analog signal. For example, the output unit 210 illustrated in FIG. 5 can be configured by the output device 917.

The storage device 919 is a data storage device configured as an example of a storage unit of the information processing device 900. The storage device 919 includes, for example, a magnetic storage unit device such as a hard disk drive (HDD), a semiconductor storage device, an optical storage device, a magneto-optical storage device, or the like. The storage device 919 stores a program executed by the CPU 901, various data, and the like. For example, the storage unit 190 illustrated in FIG. 5 can be configured by the storage device 919.

The drive 921 is a reader/writer for a recording medium, and is built in or externally attached to the information processing device 900. The drive 921 reads information recorded on the mounted removable recording medium 927 such as a magnetic disk, an optical disk, a magneto-optical disk, or a semiconductor memory, and outputs the information to the RAM 903. Furthermore, the drive 921 can also write a record on the mounted removable recording medium 927 such as a magnetic disk, an optical disk, a magneto-optical disk, or a semiconductor memory. The removable recording medium 927 is, for example, a DVD medium, an HD-DVD medium, a Blu-ray (registered trademark) medium, or the like. Furthermore, the removable recording medium 927 may be a CompactFlash (CF) (registered trademark), a flash memory, a secure digital (SD) memory card, or the like. Furthermore, the removable recording medium 927 may be, for example, an integrated circuit (IC) card on which a non-contact IC chip is mounted, an electronic device, or the like.

The connection port 923 is a port for directly connecting to the information processing device 900. Examples of the connection port 923 include a universal serial bus (USB) port, an IEEE 1394 port, a small computer system interface (SCSI) port, and the like. Other examples of the connection port 923 include an RS-232C port, an optical audio terminal, a high-definition multimedia interface (HDMI) (registered trademark) port, and the like. By connecting the external connection device 929 to the connection port 923, the information processing device 900 directly acquires various data from the external connection device 929 or provides various data to the external connection device 929.

The communication device 925 is, for example, a communication interface including a communication device or the like for connecting to a communication network (network) 931. The communication device 925 is, for example, a communication card or the like for wired or wireless local area network (LAN), Bluetooth (registered trademark), or wireless USB (WUSB). Furthermore, the communication device 925 may be a router for optical communication, a router for asymmetric digital subscriber line (ADSL), a modem for various communications, or the like. For example, the communication device 925 can transmit and receive signals and the like to and from the Internet and other communication devices according to a predetermined protocol such as TCP/IP. Furthermore, the communication network 931 connected to the communication device 925 includes a network or the like connected in a wired or wireless manner, and may be, for example, the Internet, a home LAN, infrared communication, radio wave communication, satellite communication, or the like.

An example of the hardware configuration capable of realizing the functions of the information processing device 900 constituting the information processing system 1 according to the embodiment of the present disclosure has been described above. Each component described above may be configured using a general-purpose member, or may be configured by hardware specialized for a function of each component. Therefore, it is possible to appropriately change the hardware configuration to be used in accordance with a technical level at the time of carrying out the present embodiment. Note that, although not illustrated in FIG. 18, various configurations corresponding to the information processing device 900 included in the information processing system 1 are naturally included.

Note that a computer program for realizing each function of the information processing device 900 constituting the information processing system according to the present embodiment as described above can be created and implemented on a personal computer or the like. Furthermore, a computer-readable recording medium storing such a computer program can also be provided. The recording medium is, for example, a magnetic disk, an optical disk, a magneto-optical disk, a flash memory, or the like. Furthermore, the computer program described above may be distributed via, for example, a network without using a recording medium. Furthermore, the number of computers that execute the computer program is not particularly limited. For example, a plurality of computers (for example, a plurality of servers and the like) may execute the computer program in cooperation with each other.

An example of the hardware configuration of various information processing devices constituting the information processing system 1 according to an embodiment of the present disclosure has been described above.

8. Conclusion

According to an embodiment of the present disclosure, there is provided an information processing device including: a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

According to such a configuration, since the user tries to eliminate self-occlusion by changing an orientation of at least any one of the first part and the second part, it is expected that degradation of recognition accuracy of the second part is suppressed. Furthermore, on the basis of determination that the second part is shielded by the first part, a transition may be made to a state where reception of an operation with the second part is prohibited. According to such a configuration, since a possibility of erroneous operation caused by execution of processing according to the operation while the second part is shielded by the first part is reduced, the user does not need to worry about how the second part is shown in the captured image.

The preferred embodiment of the present disclosure has been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Note that the following configurations are also within the technical scope of the present disclosure.

(1)
An information processing device including:
a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

(2)
The information processing device according to (1) above, in which
the presentation control unit controls the presentation unit to present, as the notification information, one or a plurality of first virtual objects including a region away from a reference position that is predetermined.

(3)
The information processing device according to (2) above, in which
the presentation control unit controls the presentation unit to present the first virtual objects that are separated from each other, individually in a plurality of regions away from the reference position.

(4)
The information processing device according to (2) above, in which
the presentation control unit controls the presentation unit to present one first virtual object including a region away from the reference position.

(5)
The information processing device according to any one of (2) to (4) above, in which
the reference position is a position of an object operable with the second part or a position of a wearable device worn on a body of the user.

(6)
The information processing device according to any one of (2) to (5) above, in which
the presentation control unit controls the presentation unit to present a second virtual object according to a position of the first part.

(7)

The information processing device according to (6) above, in which
the presentation control unit controls the presentation unit to present information indicating a direction according to a position of the first virtual object and a position of the second virtual object.

(8)

The information processing device according to (1) above, in which
the notification information includes changing of an attribute of a first virtual object operable with the second part.

(9)

The information processing device according to (8) above, in which
the notification information includes increasing of a size of the first virtual object as an attribute of the first virtual object.

(10)

The information processing device according to any one of (1) to (9) above, in which
it is determined that the second part is shielded by the first part in a case where reliability of a position in a depth direction is lower than first reliability.

(11)

The information processing device according to any one of (1) to (10) above, in which
the information processing device further includes:
a processing execution unit configured to execute processing according to an operation with the second part, and
the processing execution unit causes a transition to a state where reception of an operation with the second part is prohibited on the basis of determination that the second part is shielded by the first part.

(12)

The information processing device according to (11) above, in which
the processing execution unit causes a transition to a state where reception of an operation with the second part is permitted on the basis of determination that shielding of the second part by the first part is released.

(13)

The information processing device according to (12) above, in which
it is determined that shielding of the second part by the first part is released in a case where reliability of a position in a depth direction is higher than second reliability.

(14)

The information processing device according to any one of (1) to (13) above, in which
the presentation control unit increases an information amount of the notification information on the basis of a fact that it is determined again that the second part is shielded by the first part within a predetermined time from presentation of the notification information.

(15)

The information processing device according to any one of (1) to (14) above, in which
the presentation control unit increases an information amount of the notification information on the basis of determination that the second part is shielded by the first part more than a predetermined number of times within a predetermined time range.

(16)

The information processing device according to (1) above, in which
the presentation control unit controls the presentation unit to display text prompting to change the orientation, as the notification information.

(17)

The information processing device according to (1) above, in which
the presentation control unit controls the presentation unit to present voice guidance prompting to change the orientation, as the notification information.

(18)

The information processing device according to any one of (1) to (17) above, in which
the first part is a thumb, a middle finger, a ring finger, a little finger, a palm, or an arm, and
the second part is a fingertip of an index finger.

(19)

An information processing method including:
controlling, by a processor, a presentation unit to present, to a user, notification information prompting to change an orientation of at least any one of a first part or a second part, on the basis of determination that the first part shields the second part recognized on the basis of a captured image including the first part of a body of the user in an imaging range.

(20)

A program for causing a computer to function as
an information processing device including:
a presentation control unit configured to control a presentation unit to present, to a user, notification information prompting to change an orientation of at least any one of a first part or a second part, on the basis of determination that the first part shields the second part recognized on the basis of a captured image including the first part of a body of the user in an imaging range.

REFERENCE SIGNS LIST

1 Information processing system
10 Information processing device
101 Stereo depth calculation unit
103 Finger joint recognition unit
105 Processing execution unit
107 Output control unit
109 Wearable device position/orientation estimation unit
111 Inertial integration calculation unit
113 Wearable device position/orientation integration unit
115 Finger joint recognition unit
117 Finger joint recognition unit
119 Finger joint recognition integration unit
121 Inertial integration calculation unit
190 Storage unit
20 Input/output device
201a Imaging unit
201b Imaging unit
201d IR imaging unit
201c IR light source
210 Output unit
211 Display unit
213 Audio output unit
220 Inertial measurement unit
30 Wearable device
301 Imaging unit
302 Imaging unit
303 Inertial measurement unit
310 Output unit 311 Vibration presentation unit
320 Optical marker

The invention claimed is:
1. An information processing device comprising:
   circuitry configured to
      control presentation, to a user, of notification information prompting to change an orientation of at least one of a first part of a body of the user or a second part of the body of the user, based on a determination that the first part shields the second part recognized based on a captured image including the first part in an imaging range, and
      execute processing according to an operation performed with the second part,
   wherein, when the second part is shielded by the first part, a position of the second part is determined as a most probable position among possible positions of the second part based on the captured image.
2. The information processing device according to claim 1, wherein
   the circuitry controls the presentation of the notification information including one or more first virtual objects in a region away from a reference position that is predetermined.
3. The information processing device according to claim 2, wherein
   the circuitry controls the presentation of a plurality of first virtual objects to be separated from each other, individually in a plurality of regions away from the reference position.
4. The information processing device according to claim 2, wherein
   the circuitry controls the presentation of one first virtual object in the region away from the reference position.
5. The information processing device according to claim 2, wherein
   the reference position includes a position of an object operable with the second part or a position of a wearable device worn on the body of the user.
6. The information processing device according to claim 2, wherein
   the circuitry controls the presentation of the notification information further including a second virtual object according to a position of the first part.
7. The information processing device according to claim 6, wherein
   the circuitry controls the presentation of the notification information further including information indicating a direction according to a position of each first virtual object and a position of the second virtual object.
8. The information processing device according to claim 1, wherein
   the notification information includes changing of an attribute of at least one first virtual object operable with the second part.
9. The information processing device according to claim 8, wherein
   the circuitry controls the presentation of the notification information by increasing a size of the at least one first virtual object according to an attribute of each first virtual object.
10. The information processing device according to claim 1, wherein
    it is determined that the second part is shielded by the first part when reliability of a position in a depth direction is lower than a first reliability threshold.
11. The information processing device according to claim 1, wherein
    the circuitry is further configured to cause a transition to a state where reception of the operation with the second part is prohibited based on a determination that the second part is shielded by the first part.
12. The information processing device according to claim 11, wherein
    the circuitry is further configured to cause a transition to a state where reception of the operation with the second part is permitted based on a determination that shielding of the second part by the first part is released.
13. The information processing device according to claim 12, wherein
    it is determined that shielding of the second part by the first part is released when reliability of a position in a depth direction is higher than a second reliability threshold.
14. The information processing device according to claim 1, wherein
    the circuitry is further configured to increase an information amount of the notification information when it is determined again that the second part is shielded by the first part within a predetermined time from initial presentation of the notification information.
15. The information processing device according to claim 1, wherein
    the circuitry is further configured to increase an information amount of the notification information based on a determination that the second part is shielded by the first part more than a predetermined number of times within a predetermined time range.
16. The information processing device according to claim 1, wherein
    the circuitry controls the presentation of the notification information to display text prompting to change the orientation of the at least one of the first part or the second part, as the notification information.
17. The information processing device according to claim 1, wherein
    the circuitry controls the presentation of the notification information to present voice guidance prompting to change the orientation of the at least one of the first part or the second part, as the notification information.
18. The information processing device according to claim 1, wherein
    the first part includes at least one of a thumb, a middle finger, a ring finger, a little finger, a palm, or an arm, and
    the second part includes a fingertip of an index finger.
19. An information processing method comprising:
    controlling, by a processor, presentation, to a user, of notification information prompting to change an orientation of at least one of a first part or a second part, based on a determination that the first part shields the second part recognized based on a captured image including the first part of a body of the user in an imaging range; and
    executing processing according to an operation performed with the second part,
    wherein, when the second part is shielded by the first part, a position of the second part is determined as a most probable position among possible positions of the second part based on the captured image.

20. A non-transitory computer-readable storage medium having embodied thereon a program, which when executed by a computer causes the computer to execute a method, the method comprising:
- a controlling presentation, to a user, of notification information prompting to change an orientation of at least one of a first part or a second part, based on a determination that the first part shields the second part recognized based on a captured image including the first part of a body of the user in an imaging range; and
- executing processing according to an operation performed with the second part,
- wherein, when the second part is shielded by the first part, a position of the second part is determined as a most probable position among possible positions of the second part based on the captured image.

* * * * *